US007812848B2

(12) United States Patent
Shiono

(10) Patent No.: US 7,812,848 B2
(45) Date of Patent: Oct. 12, 2010

(54) MEMORY DEVICE, DISPLAY CONTROL DRIVER WITH THE SAME, AND DISPLAY APPARATUS USING DISPLAY CONTROL DRIVER

(75) Inventor: Masumi Shiono, Kanagawa (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 1514 days.

(21) Appl. No.: 10/882,316

(22) Filed: Jul. 2, 2004

(65) Prior Publication Data

US 2005/0001846 A1 Jan. 6, 2005

(30) Foreign Application Priority Data

Jul. 4, 2003 (JP) ............................. 2003-271168

(51) Int. Cl.
*G09G 5/39* (2006.01)
*G06F 13/00* (2006.01)
*G06T 1/60* (2006.01)

(52) U.S. Cl. ........................ 345/531; 345/536; 345/530

(58) Field of Classification Search ................. 345/531, 345/530, 87, 55, 30, 536, 539
See application file for complete search history.

(56) References Cited

U.S. PATENT DOCUMENTS

| | | | | |
|---|---|---|---|---|
| 4,790,022 | A * | 12/1988 | Dennis | 382/110 |
| 5,526,025 | A * | 6/1996 | Selwan et al. | 345/556 |
| 5,777,608 | A * | 7/1998 | Lipovski et al. | 345/519 |
| 5,850,483 | A * | 12/1998 | Takabatake et al. | 382/233 |
| 6,442,078 | B1 * | 8/2002 | Arimoto | 365/189.08 |
| 6,563,743 | B2 * | 5/2003 | Hanzawa et al. | 365/189.02 |
| 6,732,247 | B2 * | 5/2004 | Berg et al. | 711/169 |

FOREIGN PATENT DOCUMENTS

| | | |
|---|---|---|
| CN | 1099887 A | 3/1985 |
| CN | 1229995 A | 9/1999 |
| JP | 5-165445 | 7/1993 |
| JP | 6-324650 | 11/1994 |
| WO | WO 00/03381 | 1/2000 |

* cited by examiner

*Primary Examiner*—Joni Hsu
(74) *Attorney, Agent, or Firm*—McGinn IP Law Group PLLC

(57) ABSTRACT

A memory device includes a memory and a control circuit. The memory includes cells arranged in a matrix of rows and columns. The cells are grouped into banks, and each of the banks contains at least one column of the cells. The control circuit instructs a read operation in units of rows and a write operation in units of cells, and inhibits the read operation in units of the banks when the write operation is carried out to a specific one of the cells of a specific one of the banks.

31 Claims, 19 Drawing Sheets

Fig. 10

| Y ADDRESS \ BANKS | A | B | C | D | E | F | G | H |
|---|---|---|---|---|---|---|---|---|
| 0 | 0 | 1 | 2 | 3 | 4 | 5 | 6 | 7 |
| 1 | 3 | 0 | 1 | 2 | 7 | 4 | 5 | 6 |
| 2 | 2 | 3 | 0 | 1 | 6 | 7 | 4 | 5 |
| 3 | 1 | 2 | 3 | 0 | 5 | 6 | 7 | 4 |
| 4 | 0 | 1 | 2 | 3 | 4 | 5 | 6 | 7 |

Fig. 12

| Y ADDRESS | A | | B | | C | | D | |
|---|---|---|---|---|---|---|---|---|
| 0 | 0 | 4 | 1 | 5 | 2 | 6 | 3 | 7 |
| 1 | 3 | 7 | 0 | 4 | 1 | 5 | 2 | 6 |
| 2 | 2 | 6 | 3 | 7 | 0 | 4 | 1 | 5 |
| 3 | 1 | 5 | 2 | 6 | 3 | 7 | 0 | 4 |
| 4 | 0 | 4 | 1 | 5 | 2 | 6 | 3 | 7 |

BANKS

Fig. 13A-1
Fig. 13A-2
Fig. 13A-3
Fig. 13A-4
Fig. 13A-5
Fig. 13A-6
Fig. 13A-7
Fig. 13A-8
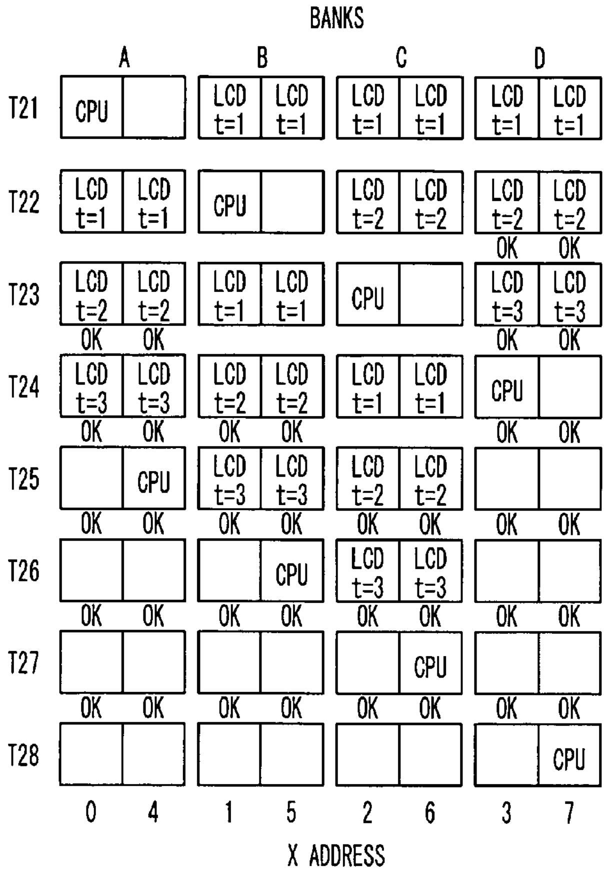
Fig. 13B-1
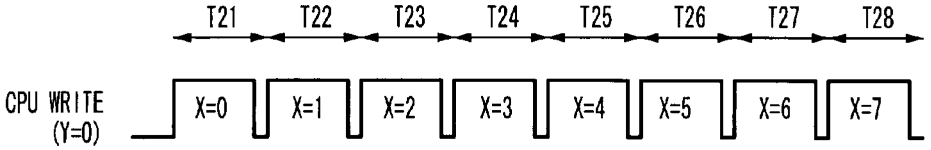
Fig. 13B-2
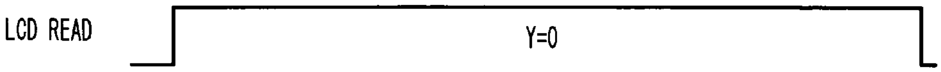

Fig. 14

| Y ADDRESS | A | | | B | | | C | | | D | | |
|---|---|---|---|---|---|---|---|---|---|---|---|---|
| 0 | 0 | 4 | 8 | 1 | 5 | 9 | 2 | 6 | 10 | 3 | 7 | 11 |
| 1 | 3 | 7 | 11 | 0 | 4 | 8 | 1 | 5 | 9 | 2 | 6 | 10 |
| 2 | 2 | 6 | 10 | 3 | 7 | 11 | 0 | 4 | 8 | 1 | 5 | 9 |
| 3 | 1 | 5 | 9 | 2 | 6 | 10 | 3 | 7 | 11 | 0 | 4 | 8 |
| 4 | 0 | 4 | 8 | 1 | 5 | 9 | 2 | 6 | 10 | 3 | 7 | 11 |

BANKS

Fig. 15

| Y ADDRESS | A | | | | B | | | |
|---|---|---|---|---|---|---|---|---|
| 0 | 0 | 4 | 8 | 12 | 1 | 5 | 9 | 13 |
| 1 | 3 | 7 | 11 | 15 | 0 | 4 | 8 | 12 |
| 2 | 2 | 6 | 10 | 14 | 3 | 7 | 11 | 15 |
| 3 | 0 | 4 | 8 | 12 | 2 | 6 | 10 | 14 |
| 4 | 3 | 7 | 11 | 15 | 0 | 4 | 8 | 12 |

BANKS

MEMORY DEVICE, DISPLAY CONTROL DRIVER WITH THE SAME, AND DISPLAY APPARATUS USING DISPLAY CONTROL DRIVER

BACKGROUND OF THE INVENTION

1. Field of the Invention

The present invention relates to a memory device, a display control driver with the same, and a display apparatus using the display control driver.

2. Description of the Related Art

FIG. 1 is a block diagram showing a conventional liquid crystal display apparatus (LCD). As shown in FIG. 1, an LCD 101 includes a CPU 2 for generating a display data, an LCD control driver 103, and an LCD panel 4 for displaying the display data. The LCD control driver 103 stores the display data generated by the CPU 2 for a one screen and then outputs the held display data for one horizontal line to the LCD panel 4 at a time. The LCD control driver 103 is composed of a display RAM (Random Access Memory) 105 for storing the display data, a control circuit 106 for controlling the display RAM 105, and a latch section 107 for latching the display data for one horizontal line outputted from the display RAM 105, and then outputting to the LCD panel 4 at a time.

In addition to a write operation by the CPU 2 (hereafter, to be referred to as a CPU write operation) and a read operation by the CPU 2 (hereafter, to be referred to as a CPU read operation), a read operation from the display RAM 105 to the LCD panel 4 is required (hereafter, to be referred to as an LCD read operation). The LCD read operation is asynchronous with the CPU write/read operation. The CPU read operation is carried out for verification of whether or not the display data is surely written into the display RAM 105, a test in case of failure occurrence, and an operation to the display data. At this time, in order to avoid conflict between the CPU write/read operation and the LCD read operation, it could be considered to use a RAM having one write port and two read ports. However, such a RAM is large in area and high in cost. For these reasons, usually, one port RAM is used as the display RAM, and an arbitration control is carried out based on a time division method, as described in International Publication WO 00/03381.

FIG. 2 is a circuit diagram showing the conventional LCD control driver having the display RAM with one port. FIGS. 3A to 3C are timing charts showing the operation of the LCD control driver. FIGS. 4A-1 to 4A-6 are diagrams showing the operation of this LCD control driver 103 for each cell. FIGS. 4B-1 and 4B-2 are timing charts showing the operation of the LCD control driver 103. As shown in FIG. 2, memory elements 8 are arranged in a matrix in the display RAM 105. The memory elements 8 of a predetermined number arranged in one row as an X-direction constitute one cell 9 for storing the display data for one pixel. The number of memory elements 8 constituting one cell 9 is 18 in this example, and the memory elements 8 store 18 bits of the data. This means that each pixel of the display data is displayed in three colors and has gradation levels of $2^6$ per color. Addresses (XADDi, YADDj) are allocated to the cells 9 as shown in FIG. 2. It should be noted that the X-direction shown in FIG. 2 corresponds to the horizontal direction of the LCD panel 4, and the Y-direction corresponds to the vertical direction of the LCD panel 4.

Also, one word line 111 is provided for each of rows of the memory elements 8 arrayed in the X-direction. Also, one data line 12 and one bit line 13 are provided for each of columns of the memory elements 8 arrayed in the Y-direction. Consequently, each of the memory elements 8 is connected to the word line 111, the data line 12 and the bit line 13. Also, the latch section 107 contains a plurality of latches 10, each of which is provided for one column of the memory elements 8. Thus, the number of the latches 10 is equal to the number of the columns of the memory elements 8. Each of the latches 10 is connected to the memory elements 8 of one column through data lines 12, and all of the latches 10 are connected to a common wiring 114.

The operation of the conventional LCD control driver 103 will be described below. As described later, a request of the LCD read operation is generated asynchronously with the CPU write/read operation. However, the one port RAM can not carry out the CPU write/read operation and the LCD read operation at a same time. Thus, the time division control is carried out. As shown in FIGS. 3A to 3C, it is supposed that the LCD read request is generated at a time T101. The LCD read operation is started in response to the LCD read request. However, if the CPU write operation is started at a time T102 during the LCD read operation, the LCD read operation is stopped. After the CPU write operation is ended at a time T103, the LCD read operation is restarted. It should be noted that the CPU write operation is carried out in a relatively large power supplied from the control circuit 106, and the LCD read operation is carried out in a small current accumulated in the memory elements 8. For this reason, the LCD read operation needs an access time longer than that of the CPU write operation. For example, the LCD read operation needs the access time equal to three times of the access time of the CPU write operation.

The operation of this conventional LCD control driver 103 will be described below in detail with reference to FIGS. 4A-1 to 4A-6 and 4B-1 and 4B-2. In order to simplify the description, FIGS. 4A-1 to 4A-6 and 4B-1 and 4B-2 show only the cells arrayed in a matrix of 3 rows×5 columns. In FIGS. 4A-1 to 4A-6, the cell noted as [CPU] indicates that the cell is in the CPU write operation, and the cell noted as [LCD] indicates that the cell is in the LCD read operation. As shown in FIGS. 4A-1 to 4A-6, and 4B-1 and 4B-2, at a time T111, the CPU write operation is carried out on the cell specified by an address (X=0, Y=0) (hereafter, to be referred to as the cell (X=0, Y=0)). At this time, the CPU write/read operation and the LCD read operation are not carried out on the other cells.

Next, after the end of the CPU write operation to the cell (X=0, Y=0), the LCD read operation is carried out on a row of cells specified by the address (Y=0) during a period of a time T112 to a time T114. As mentioned above, the LCD read operation requires the access time equal to three times of the access time of the CPU write operation. Thus, the LCD read operation is not completed only at the time T112, and the LCD read operation is completed at the time T114. In FIG. 4A-4, this is indicated by an index t noted within each cell. That is, it is supposed that in association with the time elapse of T112→T113→T114 in the LCD read operation, the index t is increased one by one, as 1→2→3, and at the time of t=3, the LCD read operation is completed. A cell noted as [OK] indicates the cell in which the LCD read operation is completed. It should be noted that if the LCD read operation is stopped prior to t=3, a next LCD read operation is again counted from t=1. During a period of the time T112 to the time T114, the CPU 2 can not carry out the CPU write operation to the other cells. Then, a wait time is generated.

Next, at a time T115, the CPU write operation is carried out on a cell (X=1, Y=0). In a period of a time T116 to a time T118 after the time T115, neither the CPU write operation nor the LCD is carried out. At this time, the wait time is generated in the CPU 2. Then, at a time T119, the CPU write operation is carried out on a cell (X=2, Y=0). After that, the similar operation is carried out. At this time, the operation cycle of the CPU 2 is the four unit times from the times T111 to T114. Thus, the 20 unit times are required to carry out the CPU write operation to the cell rows specified by the addresses (X=0 to 4, Y=0).

However, this conventional example contains the following problems. As mentioned above, in the LCD control driver 103, the CPU write operation is generated at a constant cycle and has a priority over the LCD read operation so as not to impose a burden on the CPU 2. However, the LCD read operation is an operation for writing the display data to the LCD panel 4, and it is necessary to always carry out within a certain period. For this reason, in order to reserve a time period during which the LCD read operation is carried out, the operation cycle of the CPU write operation needs to be sufficiently low. Consequently, the wait time is generated in the CPU 2. During the wait time, however, the CPU 2 can not carry out other processes and is in the wait state. As a result, the CPU 2 can not operate at an original operation speed. In this way, the operation speed of the CPU is inevitably made slower as the result of the usage of the one port RAM as the display RAM.

In recent years, the attainment of many functions, many gradations and a larger screen is demanded to the LCD installed in a portable terminal such as a mobile phone. For this reason, the scale of a display RAM built in the LCD is increased more and more. On the other hand, the higher performances such as the improvement of an access speed and the decrease in power consumption are demanded to the display RAM. In this case, from the viewpoint of the increase of the scale of the RAM, even the maintenance of the present performances becomes difficult. Thus, a technique is desired that can make the CPU operation speed higher while using the one port RAM as the display RAM.

For this purpose, a technique is proposed in which one memory is additionally installed in a LCD control driver, display data is written from a CPU to the memory, and then the CPU is released, as disclosed in Japanese Laid Open Patent Application (JP-A-Heisei 6-324650) as a second conventional example. Thus, the load on the CPU can be reduced, thereby making the operation speed of the CPU faster. However, the above-mentioned second conventional example has the following problems. That is, the technique disclosed in the second conventional example needs to further install one memory in addition to the display RAM. Thus, the scale of the LCD control driver is made larger, and the cost is increased.

SUMMARY OF THE INVENTION

Therefore, an object of the present invention is to provide a memory device for a display data, a display control driver with the memory device, and a display panel, in which the operation speed of a CPU can be made higher without increase of the scale and area of the memory device.

In an aspect of the present invention, a memory device includes a memory and a control circuit. The memory includes cells arranged in a matrix of rows and columns. The cells are grouped into banks, and each of the banks contains at least one column of the cells. The control circuit instructs a read operation in units of rows and a write operation in units of cells, and inhibits the read operation in units of the banks when the write operation is carried out to a specific one of the cells of a specific one of the banks.

Here, each of the cells may include memory elements of a predetermined number in a row direction. In this case, the memory device may further include a latch section which latches data for one row of the cells read out from the memory. The latch section may include a plurality of latches provided for columns of memory elements, respectively. Also, the plurality of latches are controlled by the control circuit in units of banks.

Also, the memory further may include two word lines, a subword line and a first switch. The two word lines are provided for each of the rows of cells. One of the two word lines is for the write operation and the other is for the read operation. The subword line is provided for the cells of each of the rows in each of the banks. The first switch is provided for each of the rows in each of the banks to select one of the two word lines in response to a switch control signal from the control circuit and to connect the selected word line with the subword line.

Also, each of the banks may contain only one column of the cells in a row direction. An address may contain an X address and a Y address, the Y address specifies each of the rows of the cells, and the X address specifies each of the columns of the cells. The X address may be incremented one by one in the row direction. In this case, the write operation may be sequentially carried out to the cells of the row which is specified based on the Y address, while the read operation is carried out to the row of the cells.

Also, each of the banks may contain only one column of the cells in a row direction. The address may contain an X address and a Y address, the Y address specifies each of the rows of the cells, and the X address specifies each of the columns of the cells. The cells of the rows of a predetermined number in each bank are allocated with sequentially different X addresses as a set, and the cells of each of the rows are allocated with sequentially different X addresses. In this case, the write operation may be sequentially carried out to the cells allocated with a same X address in units of banks, while the read operation is carried out to each of the rows of the cells. Also, an access time of each cell in the read operation is n times longer than an access time of the cell in the write operation. The number of the cells in the set is desirably more than N+1, when the least integer is grater than n is N.

Also, each of the banks may contain a plurality of the columns of the cells in a row direction. The address may contain an X address and a Y address, the Y address specifies each of the rows of the cells, and the X address specifies each of the columns of the cells. The cells of the rows of a predetermined number in each bank are allocated with sequentially different X addresses as a set, and the cells of each of the rows of the cells are allocated with sequentially different X addresses. In this case, the write operation may be sequentially carried out to the cells allocated with a same X address in units of banks, while the read operation is carried out to each of the rows of the cells. Also, an access time of each cell in the read operation may be n times longer than an access time of the cell in the write operation. The number of the cells in the set is desirably more than N+1, when the least integer is grater than n is N.

Also, the memory may contain two of the banks, and each of the banks may contain a plurality of the columns of the cells in a row direction. The address may contain an X address and a Y address, the Y address specifies each of the rows of the cells, and the X address specifies each of the columns of the cells. The cells of the rows in each bank are allocated with different X addresses, and the cells of each of the rows of the cells are allocated with sequentially different X addresses. In this case, the write operation may be alternately carried out to the two banks, while the read operation is carried out to one of the two banks to which the write operation is not carried.

Another aspect of the present invention, a display control driver includes a memory and a control circuit. The memory includes cells arranged in a matrix of rows and columns. The cells are grouped into banks, and each of the banks contains at least one column of the cells. The control circuit instructs a read operation in units of rows and a write operation in units of cells, and inhibits the read operation in units of the banks when the write operation is carried out to a specific one of the cells of a specific one of the banks.

Here, the display control driver may further include a latch section which latches data for one row of the cells read out from the memory. The latch section may include a plurality of latches provided for columns of memory elements, respectively.

Another aspect of the present invention, a display apparatus includes a display panel having a plurality of pixels, and a display control driver which includes a memory and a control circuit. The memory includes cells arranged in a matrix of rows and columns. Each of the cells stores a display data for one of the plurality of pixels, the cells are grouped into banks, and each of the banks contains at least one column of the cells. The control circuit instructs a read operation in units of rows and a write operation in units of cells, and inhibits the read operation in units of the banks when the write operation is carried out to a specific one of the cells of a specific one of the banks. The display data read out from memory by the read operation is displayed on one horizontal line of the display panel.

Here, each of the cells may include memory elements of a predetermined number in a row direction. In this case, the display control driver may further include a latch section which latches data for one row of the cells read out from the memory. The latch section may include a plurality of latches provided for columns of memory elements, respectively. Also, the plurality of latches are controlled by the control circuit in units of banks.

Also, the memory further may include two word lines, a subword line and a first switch. The two word lines are provided for each of the rows of cells. One of the two word lines is for the write operation and the other is for the read operation. The subword line is provided for the cells of each of the rows in each of the banks. The first switch is provided for each of the rows in each of the banks to select one of the two word lines in response to a switch control signal from the control circuit and to connect the selected word line with the subword line.

Another aspect of the present invention, a method of controlling a display, may be achieved by carrying out a read operation in units of rows of a memory, wherein the memory may include cells arranged in a matrix of the rows and columns, the cells are grouped into banks, and each of the banks contains at least one column of the cells; by carrying out a write operation in units of the cells of the memory; and by inhibiting the read operation in units of the banks when the write operation is carried out to a specific one of the cells of a specific one of the banks.

Here, each of the banks may contain only one column of the cells in a row direction, an address may contain an X address and a Y address, the Y address specifies each of the rows of the cells, and the X address specifies each of the columns of the cells. The X address may be incremented one by one in the row direction. In this case, the write operation may be sequentially carried out to the cells of the row which is specified based on the Y address, while the read operation is carried out to the row of the cells.

Also, each of the banks may contain only one column of the cells in a row direction, the address may contain an X address and a Y address, the Y address specifies each of the rows of the cells, and the X address specifies each of the columns of the cells. The cells of the rows of a predetermined number in each bank are allocated with sequentially different X addresses as a set, and the cells of each of the rows are allocated with sequentially different X addresses. In this case, the write operation may be sequentially carried out to the cells allocated with a same X address in units of banks, while the read operation is carried out to each of the rows of the cells.

Also, each of the banks may contain a plurality of the columns of the cells in a row direction, the address may contain an X address and a Y address, the Y address specifies each of the rows of the cells, and the X address specifies each of the columns of the cells. The cells of the rows of a predetermined number in each bank are allocated with sequentially different X addresses as a set, and the cells of each of the rows of the cells are allocated with sequentially different X addresses. In this case, the write operation may be sequentially carried out to the cells allocated with a same X address in units of banks, while the read operation is carried out to each of the rows of the cells.

Also, the memory may contain two of the banks, each of the banks may contain a plurality of the columns of the cells in a row direction. The address may contain an X address and a Y address, the Y address specifies each of the rows of the cells, and the X address specifies each of the columns of the cells. The cells of the rows in each bank are allocated with different X addresses, and the cells of each of the rows of the cells are allocated with sequentially different X addresses. In this case, the write operation may be alternately carried out to the two banks, while the read operation is carried out to one of the two banks to which the write operation is not carried.

BRIEF DESCRIPTION OF THE DRAWINGS

FIGS. 4A-1 to 4A-6 are diagrams showing the operation of the LCD control driver to cells;

FIGS. 4B-1 and 4B-2 are timing charts showing the operation of the LCD control driver;

FIG. 5 is a block diagram showing an LCD apparatus including an LCD control driver according to a first embodiment of the present invention;

FIG. 6 is a circuit diagram showing the LCD control driver according to the first embodiment;

FIGS. 8A-1 to 8A-6 are diagrams showing an operation of the LCD control driver to cells;

FIGS. 8B-1 and 8B-2 are timing charts showing the operations of the LCD control driver;

FIG. 10 is a diagram showing allocation of addresses of cells in the LCD control driver in the second embodiment;

FIG. 12 is a diagram showing allocation of addresses of cells in the LCD control driver in the third embodiment;

FIGS. 13A-1 to 13A-8 are diagrams showing an operation of the LCD control driver for cells in the third embodiment;

FIGS. 13B-1 and 13B-2 are timing charts showing the operation of the LCD control driver;

FIG. 14 is a diagram showing allocation addresses of cells in an LCD control driver according to a first modification of the third embodiment;

FIG. 15 is a diagram showing allocation addresses of cells in an LCD control driver according to a second modification of the third embodiment;

DESCRIPTION OF THE PREFERRED EMBODIMENTS

Hereinafter, a display control driver with a memory device for a display data according to the present invention, and a display apparatus using the display control driver will be described below with reference to the attached drawings, using a liquid crystal display (LCD) control driver as an example.

First Embodiment

Figure 1:
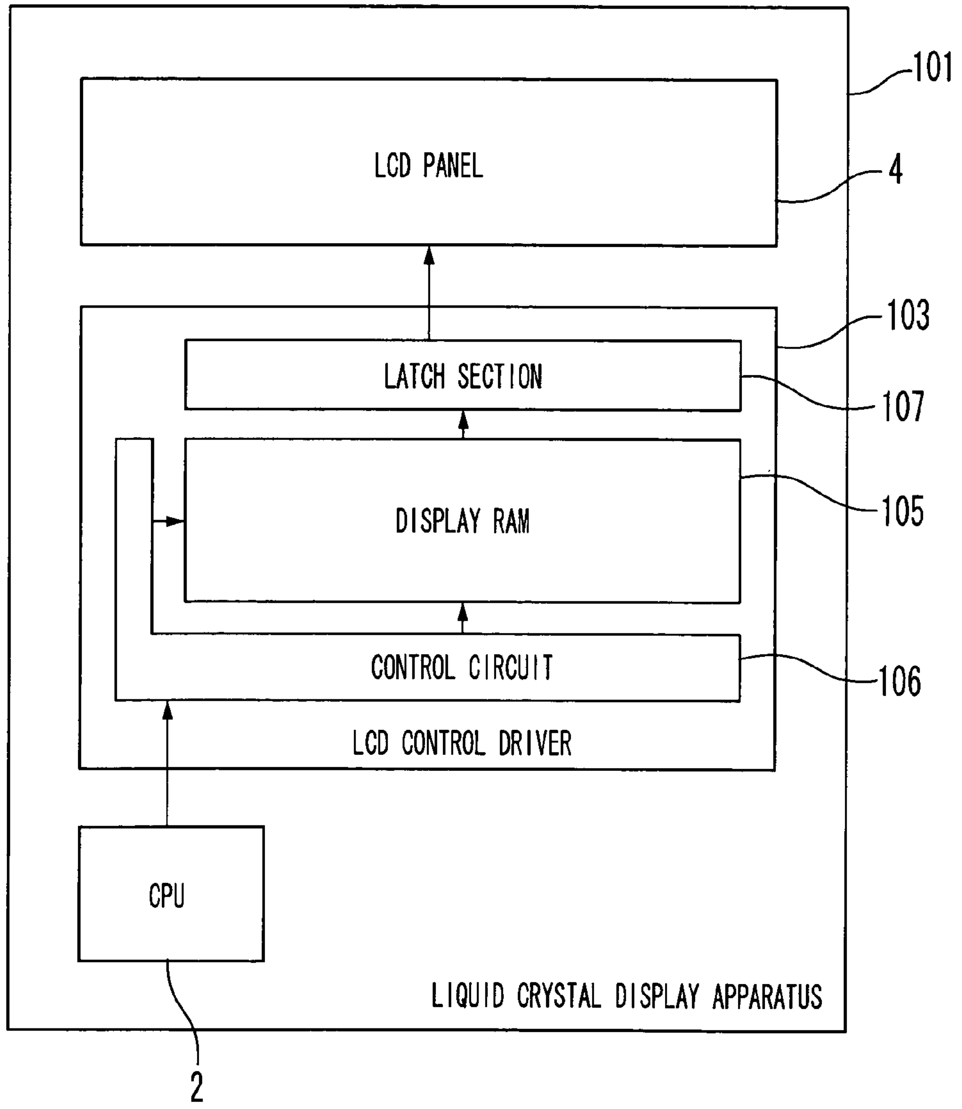
Fig. 1 PRIOR ART
FIG. 1 is a block diagram showing a conventional liquid crystal display (LCD) apparatus.
Figure 2:
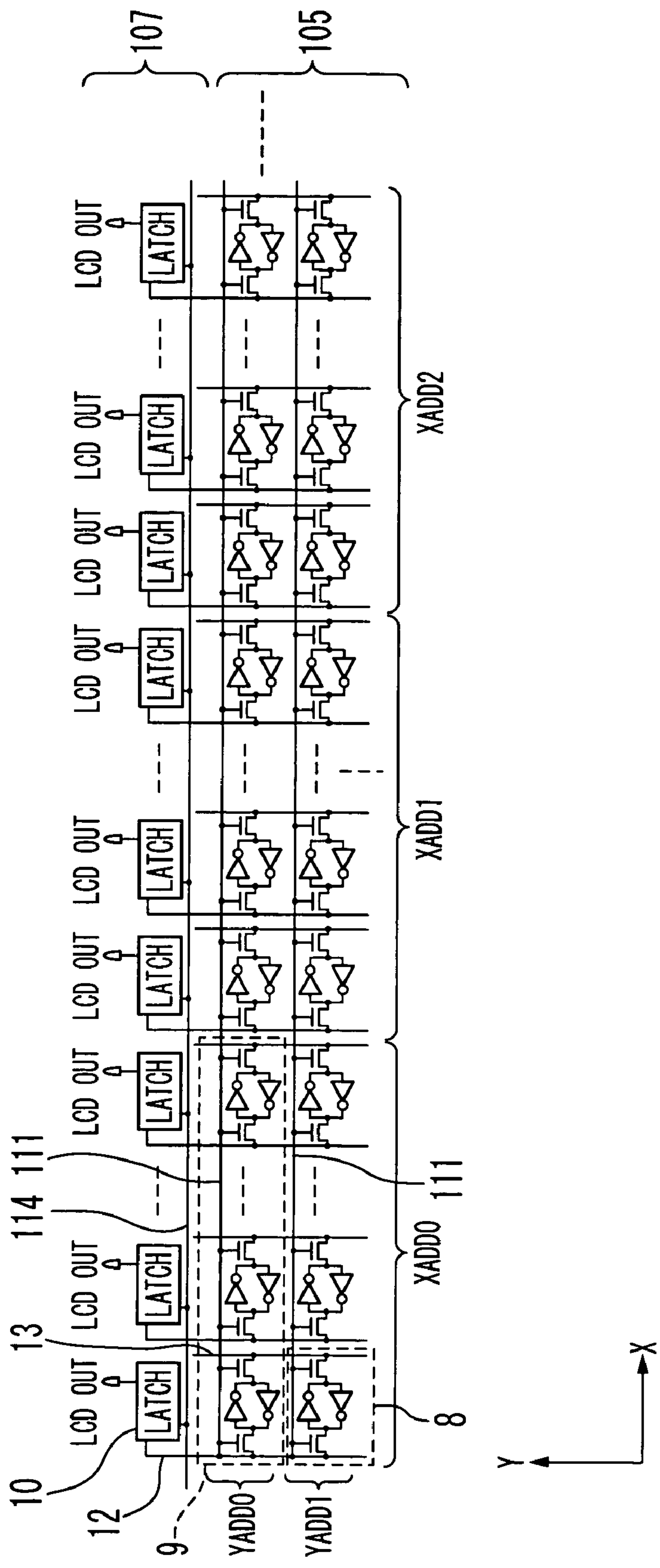
Fig. 2 PRIOR ART
FIG. 2 is a circuit diagram showing a conventional LCD control driver having a one port display RAM as a memory device.
Figures 3A, 3B, 3C:
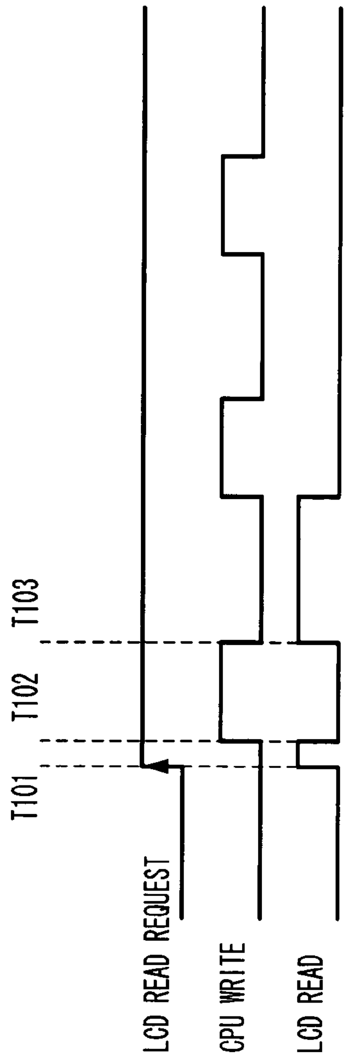
Fig. 3A PRIOR ART
Fig. 3B PRIOR ART
Fig. 3C PRIOR ART
FIGS. 3A to 3C are timing charts showing the operation of the conventional LCD control driver.
Figures 1, 2, 3, 4, 4A, 5, 6:
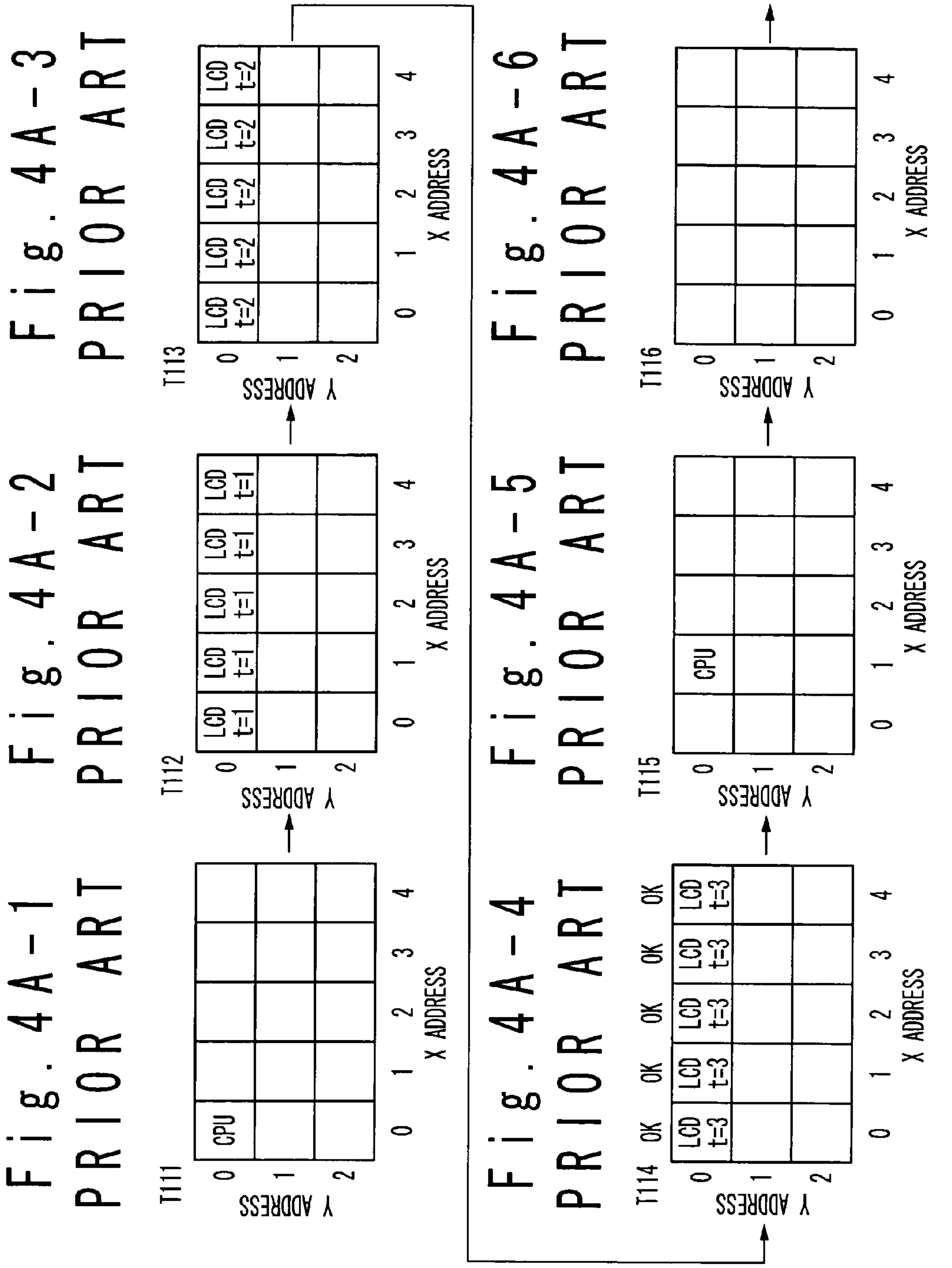
Fig. 4A-1 PRIOR ART
Fig. 4A-2 PRIOR ART
Fig. 4A-3 PRIOR ART
Fig. 4A-4 PRIOR ART
Fig. 4A-5 PRIOR ART
Fig. 4A-6 PRIOR ART
Figures 1, 2, 4B:
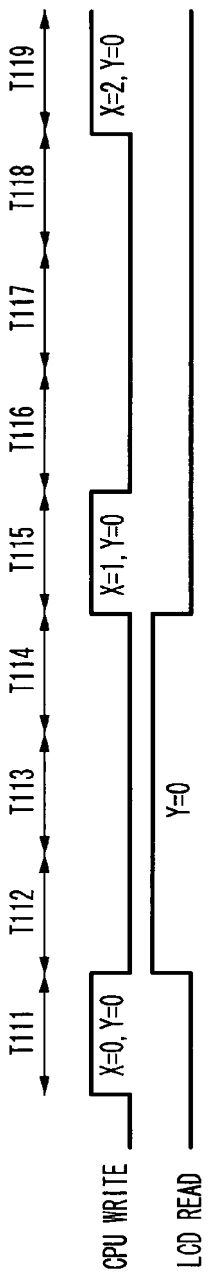
Fig. 4B-1 PRIOR ART
Fig. 4B-2 PRIOR ART
Figure 5:
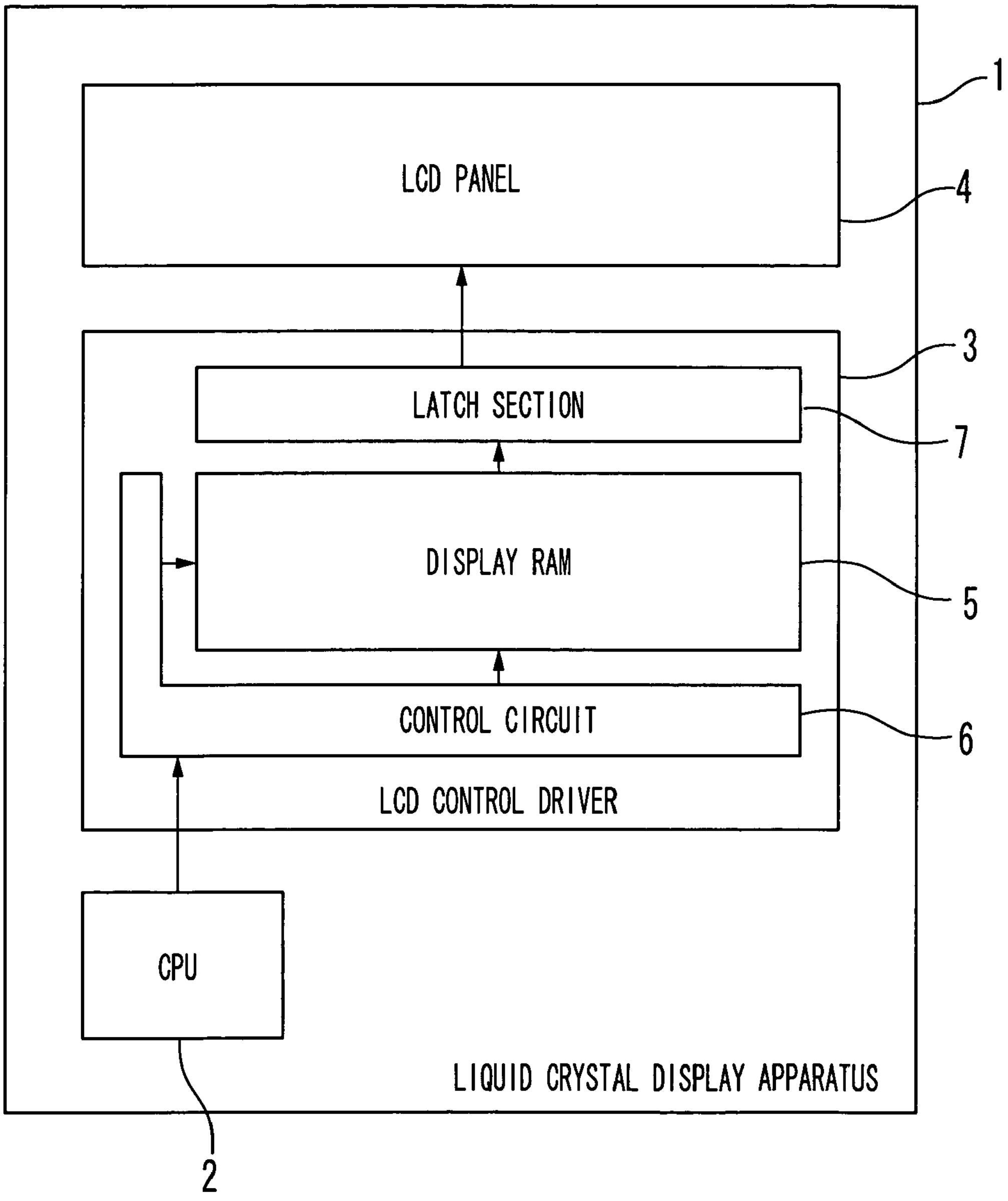
Figure 6:
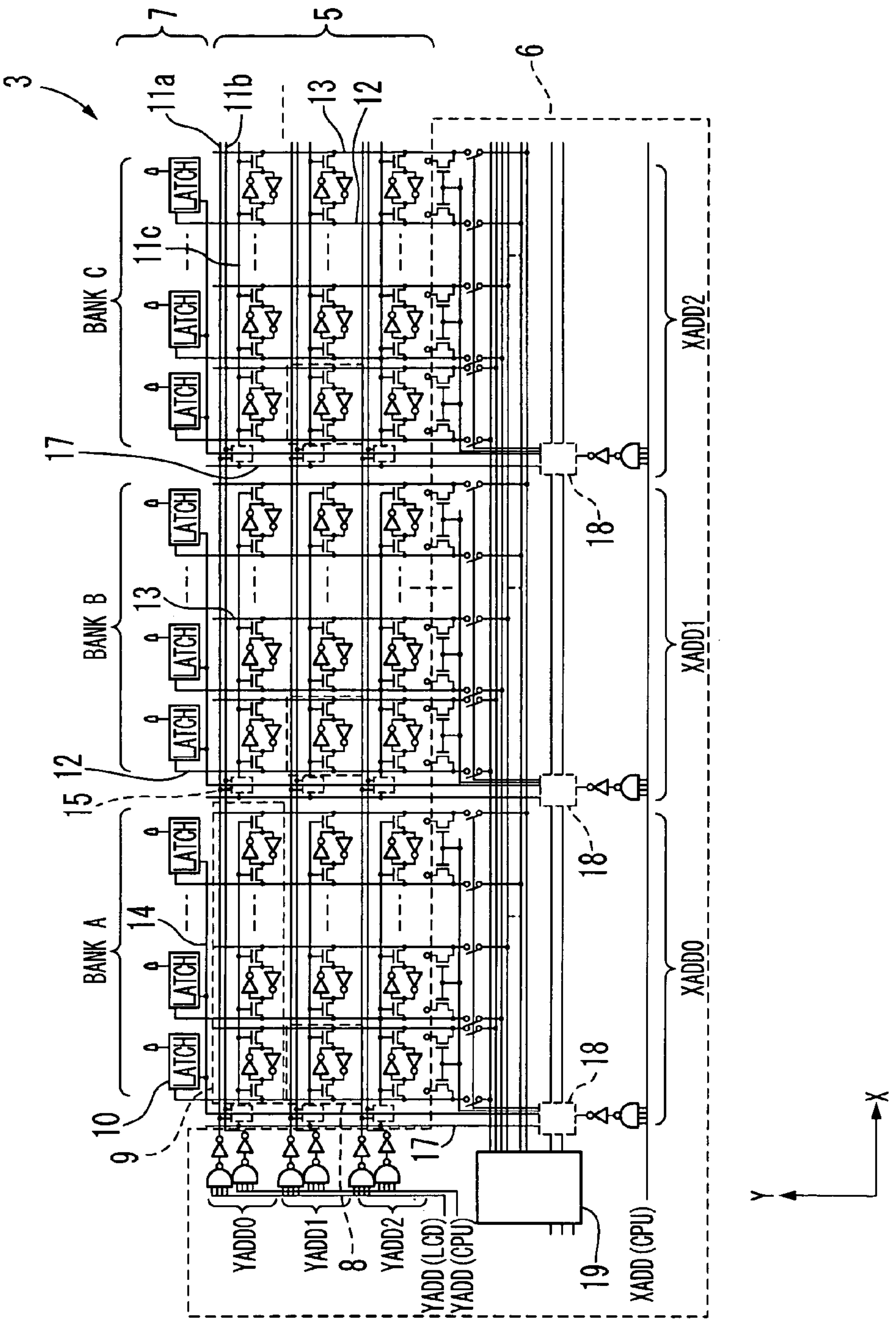
Figures 7A, 7B, 7C, 7D, 7E:
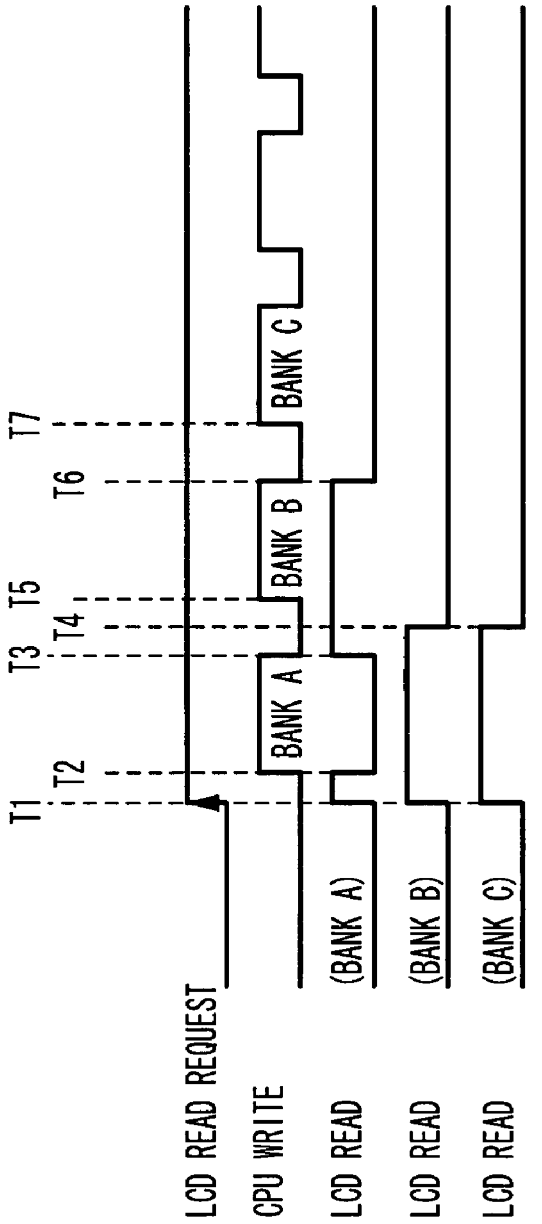
FIGS. 7A to 7E are timing charts showing the operations of the LCD control driver.
Figures 1, 2, 3, 4, 5, 6, 8A:
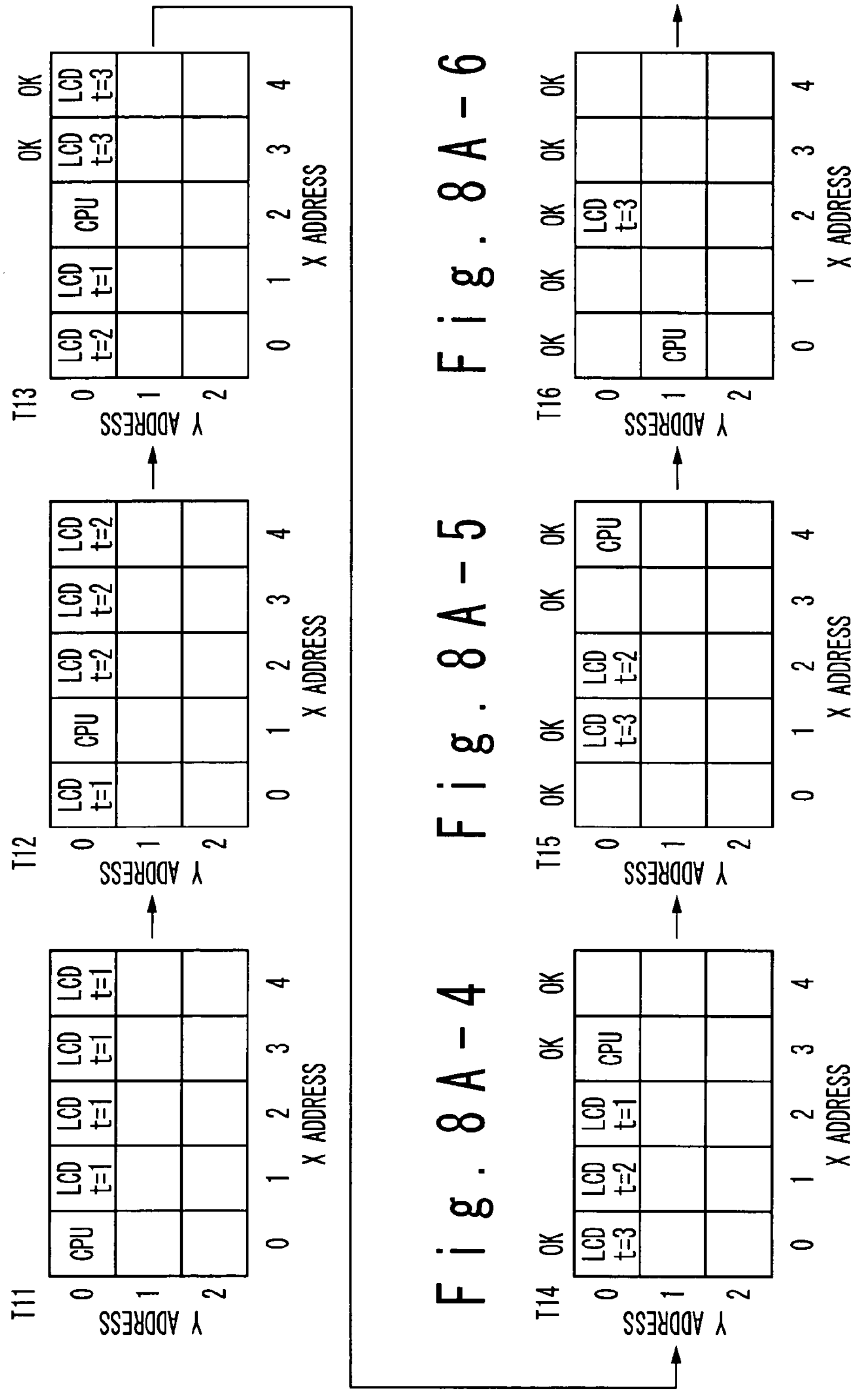
Figures 1, 2, 8B:
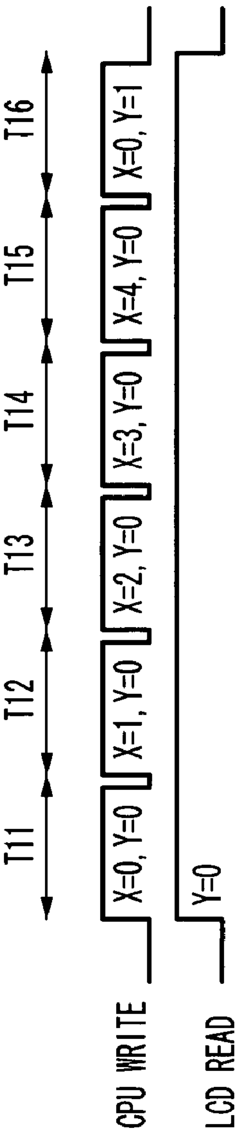

First, the LCD control driver according to the first embodiment of the present invention will be described. FIG. 5 is a block diagram showing an LCD apparatus including the LCD control driver with a memory device of a display data, according to the first embodiment. FIG. 6 is a circuit diagram showing the LCD control driver according to the first embodiment. FIGS. 7A to 7E are timing charts showing the operation of the LCD control driver. FIGS. 8A-1 to 8A-6 are diagrams showing the operation of the LCD control driver to cells, and FIGS. 8B-1 and 8B-2 are timing charts showing the operation of the LCD control driver.

As shown in FIG. 5, the liquid crystal display (LCD) apparatus 1 includes a CPU 2, an LCD control driver 3 and an LCD panel 4. The LCD control driver 3 includes a display RAM 5 for storing a display data, a control circuit 6 for controlling the display RAM 5, and a latch section 7 for latching the display data for one horizontal line outputted from the display RAM 5, and then outputting them to the LCD panel 4 at one time. It should be noted that the LCD control driver 3 is formed on one chip.

As shown in FIG. 6, in the display RAM 5, a plurality of memory elements 8 are arranged in a matrix of rows in an X direction and columns in a Y direction. For example, the 18 memory elements 8 arranged in an X-direction for one row constitute one cell 9. Thus, the cells are arranged in a matrix. When the number of pixels of the LCD panel 4 is 176 in a horizontal direction and 240 in a vertical direction, the number of cells 9 is 176 in the X-direction and 240 in the Y-direction. Also, an X address of the cell at the left end in FIG. 6 is X=0 (XADD0). Along the X-direction, the X address is increased by 1, as X=1, 2, 3, . . . Also, the Y address of the cell at the top end of FIG. 6 is Y=0 (YADD0). Along the Y-direction, the Y address is increased by 1, as Y=1, 2, 3, . . . The cells of the display RAM 5 are grouped into a plurality of banks in the X-direction. Each bank is constituted of one column of cells 9. It should be noted that FIG. 6 shows only three banks of banks A to C, for the purpose of illustrative convenience. However, the number of banks is equal to the number of columns of the cells 9. For example, when the number of columns of the cells 9 is 176, the memory elements 8 of the display RAM 5 is groped into 176 banks.

Also, in the display RAM 5, the two word lines of an LCD word line 11*a* and a CPU word line 11*b* are provided for each row of the cells 9 arranged in the X-direction. Those word lines 11*a* and 11*b* are connected to a switch 15 provided for each cell 9. A subword line 11*c* extends from the switch 15 into the X-direction in each cell 9. A switch control line 17 is provided for each bank to extend in the Y-direction, and is commonly connected to the switches 15 of the bank. Also, a switch 18 is provided for each bank, and the switch control line 17 is connected to the switch 18. Consequently, each switch 15 is controlled in accordance with a switch control signal outputted from the switch 18 onto the switch control line 17. At this time, both of the LCD word line 11*a* and the CPU word line 11*b* are not simultaneously connected to the subword line 11*c* in the same bank. Also, in the first embodiment, the latch section 7 contains a plurality of latches 10, each of which is provided for a column of memory elements 8. The latches 10 are controlled for each bank. That is, the latches 10 in each bank are commonly connected to a latch control line 14, which is connected to each switch 18. Consequently, the control circuit 6 controls the latches 10 in each bank by the switch 18. If the CPU write operation is carried out on a certain bank, the operation of the latches 10 in the bank is inhibited, namely, the LCD read operation is inhibited. Also, the operation of the latches 10 is allowed in the bank on which the CPU write operation is not carried out.

Also, the control circuit 6 includes a logic circuit (not shown) for converting the display data outputted from the CPU 2 so that the display data can be written into the display RAM 5; a circuit unit 19 in which input buffers and sense amplifiers are provided for every memory element; an oscillator (not shown) for controlling the timing of the LCD read operation; an output buffer (not shown) for converting the display data for one horizontal line outputted from the latch section 7 into a voltage signal and then outputting to the LCD panel 4.

The operation of the LCD control driver 3 will be described below. It should be noted that only the three banks of the banks A to C will be described for the purpose of the simplification of the description. As shown in FIGS. 7A to 7E, it is supposed that an LCD read request is generated at a time T1. At this time, a target row of cells of the LCD read operation is indicated by a Y-address. Consequently, the LCD read operation to the target row is started in all of the banks A to C. It is supposed that the CPU write operation is started at a time T2 during the LCD read operation. At this time, the target cell of the CPU write operation is indicated by the X address and the Y-address. The CPU write operation is sequentially carried out on each cell. At first, the CPU write operation is carried out on a cell in the bank A. Thus, although the LCD read operation to the bank A is stopped, the LCD read operation to the banks B and C are continued. Then, when the CPU write operation to the bank A is ended at a time T3, the LCD read operation to the bank A is restarted. After that, the LCD read operation to the banks B and C are ended at a time T4. The LCD read operation to the bank A is not still ended at the point. Next, the CPU write operation to the bank B is started at a time T5. At this time, although the LCD read operation to the bank A is still continued, the LCD read operation to the bank B is already ended at the time T4. Thus, the CPU write operation to the bank B does not compete with the LCD read operation. That is, the LCD read operation to the bank A and the CPU write operation to the bank B can be carried out in parallel. Then, after the CPU write operation to the bank B is ended at a time T6, the CPU write operation to the bank C is started at a time T7. Also, at this time, since the LCD read operation to the bank C is already ended at the time T4, the LCD read operation does not compete. It should be noted that the cycle time of the LCD control driver is a period between the times T2 and T5.

Another operation of the LCD control driver 3 according to the first embodiment will be described below in detail with reference to FIGS. 8A-1 to 8A-6 and 8B-1 and 8B-2. In the above example, the access time in the LCD read operation is not so much longer than that of the CPU write operation. However, in this example, the access time in the LCD read operation is about 3 times longer than that of the CPU write operation.

As shown in FIG. 8A-1, at a time T11, the CPU write operation is carried out on the cell (X=0, Y=0). At the same time, the LCD read operation is carried out on the row of cells represented by an address (X=0 to 4, Y=0) However, as mentioned above, the latch operation is inhibited in the bank on which the CPU write operation is carried out. Thus, the LCD read operation is not carried out on the cell (X=0, Y=0). Therefore, the LCD read operation is carried out on only the four cells (X=1 to 4 Y=0). Also, the LCD read operation needs an access time equal to about three times that of the CPU write operation. Thus, at the time T11, the LCD read operation is not completed. This state is indicated as t=1. The CPU write operation to the cell (X=0, Y=0) is ended at the time T11.

Next, as shown in FIG. 8A-2, at a time T12, the CPU write operation is carried out on the cell (X=1, Y=0). At this time, although the LCD read operation to the cell (X=1, Y=0) is stopped, the LCD read operation to the three cells (X=2 to 4, Y=0) is continued in their original states. This state is indicated as t=2. Also, the LCD read operation is started to the cell (X=0, Y=0) in which the CPU write operation is ended at the time T11. This state is indicated as t=1. It should be noted that a time when a CPU write signal becomes low between the CPU write operation to the cell (X=0, Y=0) and the CPU write operation to the cell (X=1, Y=0) is referred to as a recovery time. This is a short time after the CPU write signal is once settled to the low level until it is allowed to again rise to a high level.

Next, as shown in FIG. 8A-3, at a time T13, the CPU write operation is carried out on the cell (X=2, Y=0). At this time, although the LCD read operation to the cell (X=2, Y=0) is stopped, the LCD read operation to the three cells (X=0, 3, 4, Y=0) are continued in their original states. As a result, in the cell (X=0, Y=0), the state is indicated as t=2, and in the cells (X=3, 4, Y=0), the state is indicated as t=3. Thus, the LCD read operation to the cells (X=3, 4, Y=0) is ended. Moreover, the LCD read operation is started to the cell (X=1, Y=0) in which the CPU write operation is ended at the time T12. This state is indicated as t=1.

Next, as shown in FIG. 8A-4, at a time T14, the CPU write operation is carried out on the cell (X=3, Y=0). At this time, since the LCD read operation to the cell (X=3, Y=0) is already ended at the time T13, the CPU write operation does not compete. Also, the LCD read operation to the two cells (X=0, 1, Y=0) is continued. As a result, in the cell (X=0, Y=0), the state is indicated as t=3, and the LCD read operation is ended. In the cell (X=1, Y=0), the state is indicated as t=2. Also, the LCD read operation is started to a cell (X=2, Y=0) in which the CPU write operation is ended at the time T13. This state is indicated as t=1.

Next, as shown in FIG. 8A-5, at a time T15, the CPU write operation is carried out on the cell (X=4, Y=0). At this time, since the LCD read operation to the cell (X=4, Y=0) is already ended at the time T13, the CPU write operation does not compete. Also, the LCD read operation to the two cells (X=1, 2, Y=0) is continued. As a result, in the cell (X=1, Y=0), the state is indicated as t=3, and the LCD read operation is ended. Also, in the cell (X=2, Y=0), the state is indicated as t=2. At the time T15, the CPU write operation to the row represented by the address (Y=0) is ended.

Next, as shown in FIG. 8A-6, at a time T16, in the cell (X=2, Y=0), the state is indicated as t=3, and the LCD read operation is ended. Consequently, the LCD read operation to the row of cells represented by the address (Y=0) is ended. It should be noted that at this time, the CPU 2 may start the CPU write operation to the next row of cells represented by the address (Y=1). Hereafter, the similar operation is carried out. In this case, the operation cycle of the CPU 2 is one unit time. Thus, the CPU write operation to the row of cells represented by the address (Y=0) is ended in the five unit times.

In this way, through the CPU write operation, the display data for one screen is written from the CPU 2 to the display RAM 5. Through the LCD read operation, the display data for one horizontal line read out from the display RAM 5 is latched by the latch section 7. Next, the latch section 7 converts the display data into a higher drive voltage signal, and outputs a set of the display data for one horizontal line to the LCD panel 4. Consequently, the LCD panel 4 displays the display data.

In the first embodiment, the memory elements 8 of the display RAM is grouped into a plurality of banks, and the LCD read operation is carried out to the bank on which the CPU write operation is not carried out. Thus, it is not necessary to provide a dedicated access time to carry out the LCD read operation between the CPU write operations. For this reason, the CPU can output the display data to the LCD control driver at the original operation speed of the CPU without considering the access time necessary for the LCD read operation. As a result, the load on the CPU can be reduced, thereby making the operation cycle of the CPU faster.

An example of the cycle time of the display RAM 5 will be described below. The conventional LCD control driver is manufactured as follows. That is, when it is manufactured in the process of 0.25 μm, the drive voltage is set to 1.8V, the threshold voltages of Vt are used as the central values of the threshold voltages of a P-type transistor and an N-type transistor, and the temperature is set at 25° C. In this case, the RAM cycle time becomes a CPU write (read) operation access time (80 ns)+an LCD read operation access time (100 ns)=180 ns. This corresponds to a frequency of 5.56 MHz.

On the other hand, in the LCD control driver according to the first embodiment, under the condition similar to those of the conventional LCD control driver, the RAM cycle time becomes a CPU write (read) operation access time (80 ns)+a recovery time (5ns)=85 ns. This corresponds to a frequency of 11.76 MHz. Thus, the speed ratio to the conventional LCD control driver becomes 11.76 MHz/5.56 MHz=about 2.1 times.

Also, in the display RAM, current consumed for the pre-charge of bit lines usually occupies about 80% of the entire consumption current. In the conventional display RAM, the word line is common to all of the cells of one row in the X-direction. For the reason, even when the CPU write (read) operation is carried out to only one cell, the pre-charge to all of the bit lines of the cells is carried out every time. Consequently, the current larger than necessary is consumed. On the other hand, in the first embodiment, the subword line is used in each bank. Thus, when the CPU write (read) operation is carried out to the selected bank, only the bit lines of the selected bank is pre-charged. Therefore, the consumption current can be reduced.

An example of the consumption current of the display RAM will be described below. In the conventional display RAM, supposing that a 16-bit BUS is used, the number of the entire memory elements is 132×176. Also, in order to reduce the load and improve the cycle time, it is supposed that the memory elements 8 are grouped into two RAMs of (64×176) and (68×176). At this time, if it is supposed that the entire consumption current in the RAM in which the number of memory elements is (68×176) is 100, the current consumed to pre-charge the bit lines is 80.

On the other hand, in the first embodiment, since the memory elements of the RAM are groped into the banks, the current (80) consumed to pre-charge the bit line is divided by 68. Thus, the consumption current of the display RAM according to the first embodiment is a summation of the consumption current for the bit line pre-charge (80/68)+the consumption current except the pre-charge (100-80)=21.176. In this way, in the first embodiment, it is enough that the current consumed in relation with the pre-charge of the bit line is (80/68)=1.176. Thus, with respect to the consumption current in the entire display RAM, when the conventional display RAM is supposed to be 100, the display RAM in the first embodiment is 21.176. Therefore, the consumption current can be reduced to about ⅕. It should be noted that the current consumed by the pre-charge of the bit lines will be increased in future in association with the enlargement of the scale of the display RAM. Therefore, the effect of the reduction in the consumption current as mentioned above will be more and more important in future.

Second Embodiment

Figure 9:
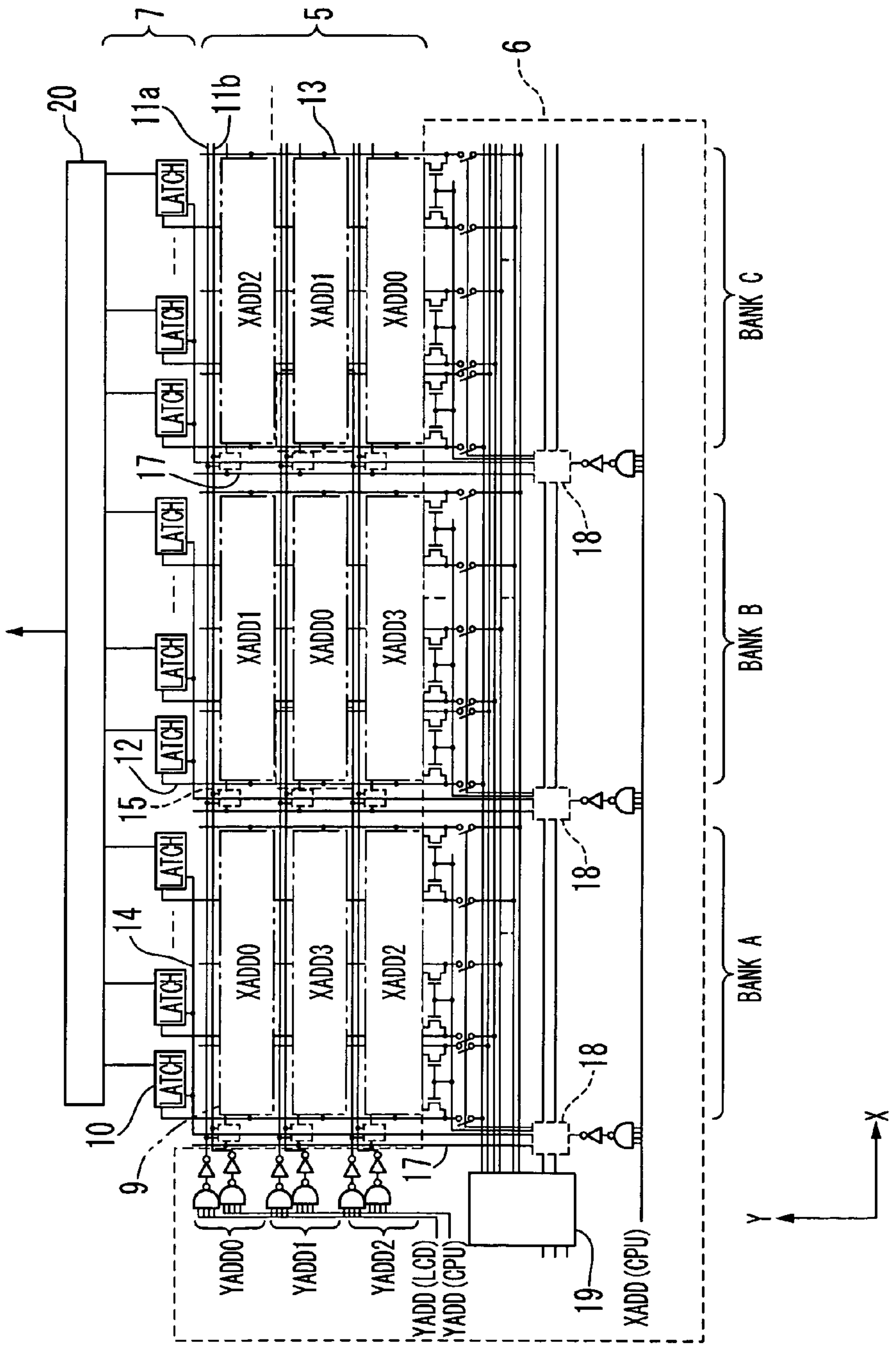
FIG. 9 is a circuit diagram showing the LCD control driver according to a second embodiment of the present invention.

The LCD control driver according to the second embodiment of the present invention will be described below. FIG. 9 is a circuit diagram showing the LCD control driver in the second embodiment, and FIG. 10 is a diagram showing a method of allocating an address of each of cells in the LCD control driver. In the first embodiment, the X addresses of the cells are allocated to increase one by one along the X-direction, as X=0, 1, 2, . . . , and the Y address is allocated to increase one by one along the Y-direction as Y=0, 1, 2, . . . Thus, the memory elements 8 of the display RAM is grouped into the plurality of banks along the X-direction. For this reason, as described in the first embodiment, the display data is horizontally written to the display RAM, namely, the CPU write operation is sequentially carried out on the cells arranged in the X-direction. In other wards, after the CPU write operation is carried out on one bank, the CPU write operation can be carried out on another bank at the next timing. Consequently, the CPU write operation and the LCD read operation can be carried out in parallel, thereby operating the CPU at a high speed.

However, when a display data rotated by 90° is displayed on the LCD panel 4, there is a case that the display data is vertically written into the display RAM. At this time, the CPU write operation is sequentially carried out on the cells of the display RAM arranged in the Y-direction. In this case, the CPU write operation is continuously carried out on the same bank. Thus, while the CPU write operation is carried out on a bank, the LCD read operation can not be carried out on the bank. Therefore, the higher speed operation of the CPU can not be attained.

In the second embodiment, the display RAM is designed so as to achieve the higher speed operation of the CPU, even when the display data is vertically written, unlike the first embodiment. As shown in FIGS. 9 and 10, the LCD control driver according to the second embodiment differs from the LCD control driver 3 according to the first embodiment, in the method of allocating the addresses of the cells in a display RAM 25. It should be noted that in FIG. 10, fields arranged in a matrix correspond to the respective cells, and a numeral written in each field indicates an X addresses of the cell. The memory elements 8 of the display RAM 25 is grouped into a plurality of banks along the X-direction, and they are arranged as a bank A, a bank B, a bank C, . . . , from the left end of FIG. 10. Each bank is composed of a column of cells, like the first embodiment.

In the cell row represented by Y=0, the X address of the cell is X=0 (XADD0) for the bank A, is X=1 (XADD1) for the bank B, is X=2 (XADD2) for the bank C and is X=3 (XADD3) for the bank D. Also, in the cell row represented by Y=1, the X address of the cell is X=3 (XADD3) for the bank A, is X=0 (XADD0) for the bank B, is X=1 (XADD1) for the bank C and is X=2 (XADD2) for the bank D. Moreover, in the cell row represented by Y=2, the X address of the cell is X=2 (XADD2) for the bank A, is X=3 (XADD3) for the bank B, is X=0 (XADD0) for the bank C and is X=1 (XADD1) for the bank D. In this way, the four X addresses represented by X=0 to 3 are handled as one set, and the X addresses are allocated to each row of cells one by one, so that the same X address is not always allocated to the same bank in the four continuous rows. Similarly, in case of the X addresses of X>4, the four X addresses are handled as one set so that the same X address is not allocated to the same bank.

In the LCD control driver 3, the control unit 19 controls the CPU write/read operation in such a manner that the X addresses are subjected to the above X address allocation rule. However, the CPU may carry out the CPU write operation while changing the X address of the target cell on which the CPU write operation is carried out. Also, in the back stage of the latch section 7, a signal rearranging circuit 20 is provided to rearrange bits of the display data outputted from each cell in correspondence with the pixels of the LCD panel 4. That is, as shown in FIG. 10, in the row of cells corresponding to Y=1 in the display RAM 5, the X addresses of the cells belonging to the banks A, B, C, D, E, F, G, H, . . . are X=3, 0, 1, 2, 7, 4, 5, 6, . . . . The display data latched by the respective latches 10 corresponding to the banks A, B, C, D, E, F, G, H, . . . are also arranged in this order. However, the signal rearranging circuit 20 carries out the re-arrangement based on the Y address so that the display data becomes X=0, 1, 2, 3, 4, 5, 6, 7 . . . . The configuration other than the above-mentioned configuration in the second embodiment is similar to that of the first embodiment.

The operation of the second embodiment will be described below. The operation when the CPU 2 horizontally writes the display data into the display RAM 25 is similar to that of the first embodiment. Hereinafter, the operation when the display data is vertically written will be described. As shown in FIG. 10, at first, the CPU write operation is carried out on the cell (X=0, Y=0). At this time, the CPU write operation is carried out on the bank A. The LCD read operation can be carried out on the banks except the bank A. Subsequently, the CPU write operation is carried out on the cell (X=0, Y=1). At this time, the CPU write operation is carried out on the bank B. The LCD read operation can be carried out on the banks except the bank B. Subsequently, the CPU write operation is carried out on the cell (X=0, Y=2). At this time, the CPU write operation is carried out on the bank C. Subsequently, the CPU write operation is carried out on the cell (X=0, Y=3). At this time, the CPU write operation is carried out on the bank D.

When the LCD read operation to one row of cells is ended, the display data for one horizontal line is latched by the latch section 7. At this time, the display data latched by the respective latches 10 of the latch section 7 are arranged in the order of the X addresses of the target row of cells of the LCD read operation. Next, the latch section 7 outputs the display data for the one horizontal line to the circuit 20. The signal rearranging circuit 20 re-arranges the display data to be coincident with the pixels of the LCD panel 4. For example, the bits of the display data read out from the row of cells corresponding to Y=1 are arranged such that the X addresses become X=3, 0, 1, 2, 7, 4, 5, 6, However, the circuit 20 re-arranges them so that they become X=0, 1, 2, 3, 4, 5, 6, 7,.

In this way, in the second embodiment, even when the display data is vertically written, the target bank of the CPU write operation is changed while the target cell of the CPU write operation is changed. For example, it is supposed that the access time necessary for the LCD read operation is three times of the access time necessary for the CPU write operation. In this case, if the X addresses are allocated to the banks or columns of cells such that the LCD read operation is carried out once for the CPU write operation of five times or more, the LCD read operation can be completed during the CPU write operation. Thus, the waiting time of the CPU can be eliminated. The operation other than the above-mentioned operation in the second embodiment is similar to that of the first embodiment.

In the second embodiment, the operation speed of the CPU can be made faster, in both of the cases when the display data is horizontally written to the display RAM and when it is vertically written. The effects other than the above-mentioned effect in the second embodiment are similar to those of the first embodiment.

Third Embodiment

Figure 11:
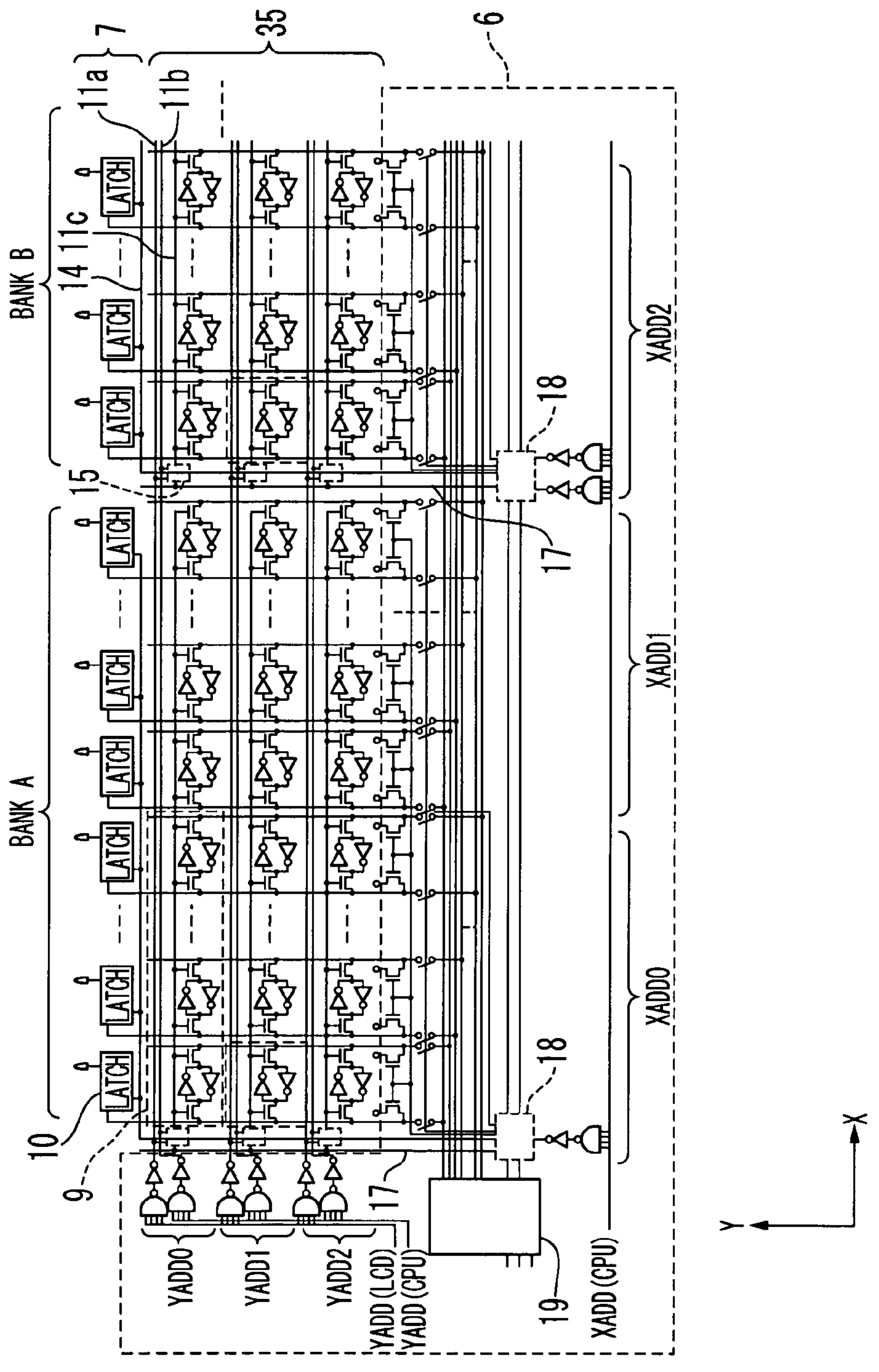
FIG. 11 is a circuit diagram showing the LCD control driver according to a third embodiment of the present invention.

The LCD control driver according to the third embodiment of the present invention will be described below. FIG. 11 is a circuit diagram showing the LCD control driver according to the third embodiment. FIG. 12 is a diagram showing a method of allocating X addresses of the cells in the LCD control driver. FIGS. 13A-1 to 13A-8 are diagrams showing the operation of the LCD control driver for each cell, and FIGS. 13B-1 and 13B-2 are timing charts showing the operation of the LCD control driver.

In the first embodiment, the memory elements 8 of the display RAM are grouped into the banks for every column, and each bank contains one column of cells. However, in the third embodiment, as shown in FIGS. 11 and 12, the memory elements 8 of the display RAM are grouped into the banks such that the two columns of cells are contained in one bank. From the left end of FIGS. 11 and 12, the banks are arranged as a bank A, a bank B, a bank C, . . . . One LCD word line 11*a*, one CPU word line 11*b* are provided for one row of cells. One switch 15 is provided for one row of cells in each bank. One subword line 11*c*, one latch control line 14, one switch control line 17 and one switch 18 are provided for each bank.

Also, as shown in FIG. 12, in the row of cells represented by Y=0, the bank A contains a cell (X=0, Y=0) and a cell (X=4, Y=0), the bank B contains a cell (X=1, Y=0) and a cell (X=5, Y=0), the bank C contains a cell (X=2, Y=0) and a cell (X=6, Y=0), and the bank D contains a cell (X=3, Y=0) and a cell (X=7, Y=0). Also, in the row of cells represented by Y=1, the bank A contains a cell (X=3, Y=1) and a cell (X=7, Y=1), the bank B contains a cell (X=0, Y=1) and a cell (X=4, Y=1), the bank C contains a cell (X=1, Y=1) and a cell (X=5, Y=1), and the bank D contains a cell (X=2, Y=1) and a cell (X=6, Y=1). Moreover, in the row of cells represented by Y=2, the bank A contains a cell (X=2, Y=2) and a cell (X=6, Y=2), the bank B contains a cell (X=3, Y=2) and a cell (X=7, Y=2), the bank C contains a cell (X=0, Y=2) and a cell (X=4, Y=2), and the bank D contains a cell (X=1, Y=2) and a cell (X=5, Y=2). Furthermore, on the row of cells represented by Y=3, the bank A contains a cell (X=1, Y=3) and a cell (X=5, Y=3), the bank B contains a cell (X=2, Y=3) and a cell (X=6, Y=3), the bank C contains a cell (X=3, Y=3) and a cell (X=7, Y=3), and the bank D contains a cell (X=0, Y=3) and a cell (X=4, Y=3). The method of allocating the X addresses on the row of cells represented by Y=4 is similar to that on the row of cells represented by Y=0 as mentioned above. Also, the X addresses of ≧8 are allocated to the bank E and the subsequent banks, similarly to a case where the X addresses X=0 to 7 are allocated to the banks. For example, the eight cells are handled as one set, and the X addresses are allocated. Moreover, in the back stage of the latch section 7, the signal rearranging circuit (not shown) is provided to rearrange the bits of the display data outputted from each cell in correspondence with the array of the pixels of the LCD panel 4, like the second embodiment. The configuration other than the above-mentioned configuration in the third embodiment is same as that of the first embodiment.

The operation of the LCD control driver according to the third embodiment will be described below with reference to FIGS. 13A-1 to 13A-8 and FIGS. 13B-1 and 13B-2. In FIGS. 13A-1 to 13A-8 and FIGS. 13B-1 and 13B-2, only the cells represented by Y=0 in the banks A to D will be described. However, the similar operation is carried out to the cells of the X addresses of ≧8 for the bank E and the subsequent.

As shown in FIGS. 13A-1 to 13A-8 and FIGS. 13B-1 and 13B-2, at a time T21, the CPU write operation is carried out on the cell (X=0, Y=0). At the same time, the LCD read operation is carried out on the row of cells represented by the address (Y=0). However, the LCD read operation can not be carried out on the cells within the bank A on which the CPU write operation is carried out. Thus, the LCD read operation is not carried out on the cell (X=0, Y=0) and the cell (X=4, Y=0). The LCD read operation is carried out on only the six cells (X=1, 5, 2, 6, 3, 7, Y=0) belonging to the banks B, C and D. Also, the LCD read operation needs the access time equal to three times that of the CPU write operation. Therefore, at the time T21, the LCD read operation is not completed. The state is indicated as t=1. The CPU write operation to the cell (X=0, Y=0) is ended at the time T21.

Next, at a time T22, the CPU write operation is carried out on the cell (X=0, Y=1) which is contained in the bank B. At this time, the LCD read operation to the cell (X=1, Y=0) and the cell (X=5, Y=0) which belong to the bank B are stopped. However, the LCD read operation to the four cells (X=2, 6, 3, 7, Y=0) belonging to the banks C, D are continued. Thus, the state is indicated as t=2. Also, the LCD read operation is started on the cell (X=0, Y=0) and the cell (X=4, Y=0) in which the CPU write operation is ended at the time T21. The state is indicated as t=1.

Next, at a time T23, the CPU write operation is carried out on the cell (X=0, Y=3) which is contained the bank C. At this time, although the LCD read operation to the cell (X=2, Y=0) and the cell (X=6, Y=0) which belong to the bank C are stopped, the LCD read operation to the four cells (X=3, 7, 0, 4, Y=0) belonging to the banks D and A are continued. As a result, the state is indicated as t=3 in the cells (X=3, 7, Y=0). The LCD read operation is ended. Also, the state is indicated as t=2 in the cells (X=0, 4, Y=0). Moreover, the LCD read operation is started on the cells (X=1, 5, Y=0) of the bank B in which the CPU write operation is ended at the time T22. The state is indicated as t=1.

Next, at a time T24, the CPU write operation is carried out on the cell (X=0, Y=3) which is contain in the bank D. At this time, the LCD read operation to the cell (X=3, Y=0) and the cell (X=7, Y=0) which belong to the bank D are already ended at the time T23. Thus, the CPU write operation does not compete. Also, the LCD read operations from the four cells (X=0, 4, 1, 5, Y=0) belonging the banks A, B are continued. As a result, the state is indicated as t=3 in the cell (X=0, Y=0) and cell (X=4, Y=0). Thus, the LCD read operation is ended. Also, the state is indicated as t=2 in the cell (X=1, Y=0) and the cell (X=5, Y=0). Moreover, the LCD read operation is started to the cell (X=2, Y=0) and the cell (X=6, Y=0) in which the CPU write operation is ended at the time T23. The state is indicated as t=1.

Next, at a time T25, the CPU write operation is carried out on the cell (X=4, Y=0) which is contained in the bank A. At this time, the LCD read operation to the cell (X=0, Y=0) and the cell (X=4, Y=0) which belong to the bank A is already ended at the time T24. Thus, the CPU write operation does not compete. Also, the LCD read operation from the four cells (X=1, 5, 2, 6, Y=0) belonging to the banks B, C is continued. As a result, the state is indicated as t=3 in the cell (X=1, Y=0) and the cell (X=5, Y=0). Thus, the LCD read operation is ended. Also, the state is indicated as t=2 in the cell (X=2, Y=0) and the cell (X=6, Y=0).

Next, at a time T26, the CPU write operation is carried out on the cell (X=4, Y=1) which is contained in the bank B. At this time, the LCD read operation to the cell (X=1, Y=0) and the cell (X=5, Y=0) which belong to the bank B are already ended. Thus, the CPU write operation does not compete. Also, the LCD read operation to the two cells (X=2, Y=0) and (X=6, Y=0) which belong to the bank C are continued in their original state. As a result, the state is indicated as t=3 in the cell (X=2, Y=0) and the cell (X=6, Y=0). The LCD read operation is ended. Consequently, the LCD read operation to the 8 cells (X =0 to 7, Y=0) is ended. The same operation as described above is carried out to the cells of the X addresses of ≧8. Therefore, the LCD read operation to the row of cells represented by the Y=0 is ended at this point.

Next, at a time T27, the CPU write operation is carried out on the cell (X=4, Y=2) which is contained to the bank C. At this time, the LCD read operation to the cell (X=2, Y=0) and the cell (X=6, Y=0) which belong to the bank C are already ended at the time T26. Thus, the CPU write operation does not compete.

Next, at a time T28, the CPU write operation is carried out on the cell (X=4, Y=3) which is contained in the bank D. At this time, the LCD read operation to the cell (X=3, Y=0) and the cell (X=7, Y=0) which belong to the bank D is already ended at the time T23. Thus, the CPU write operation does not compete. Consequently, the CPU write operations to the 8 cells (X=0 and 1 Y=0 to 3) are ended. The operations other than the above-mentioned operation in the embodiment are similar to those of the first embodiment.

In the description, the CPU write operation is carried out to the cells (X=4) after the cells (X=0). However, the CPU write operation may be carried out to other cells (X=0) after the cells (X=0). That is, at the time 25, the CPU write operation may be carried out to the cell (X=0, Y=4).

In the third embodiment, it is possible to reduce the number of the circuits installed between the columns of cells, namely, the latch control line 14, the switch 15, the switch control line 17 and the switch 18, by reducing the number of the banks, as compared with the first embodiment. Thus, the length in the X-direction of the display RAM can be reduced. The effects other than the above-mentioned effect in the third embodiment are similar to those of the first embodiment.

A first modification of the third embodiment will be described below. FIG. 14 is a view showing a method of allocating the X addresses of the cells in an LCD control driver according to the first modification. As shown in FIG. 14, in the first modification, the memory elements 8 of the display RAM is grouped into cells such that each bank is constituted from three columns of cells.

As shown in FIG. 14, in the display RAM in the first modification, 12 cells are handled as one set, and the addresses are allocated such that the continuous addresses are not arranged within the same bank in a same row. For example, on the row of cells represented by Y=0, the bank A includes the cell (X=0, Y=0), the cell (X=4, Y=0) and the cell (X=8, Y=0), the bank B includes the cell (X=1, Y=0), the cell (X=5, Y=0) and the cell (X=9, Y=0), the bank C includes the cell (X=2, Y=0), the cell (X=6, Y=0) and the cell (X=10, Y=0), and the bank D includes the cell (X=3, Y=0), the cell (X=7, Y=0) and the cell (X=11, Y=0). Also, on the row of cells represented by Y=1, the bank A includes the cell (X=3, Y=1), the cell (X=7, Y=1) and the cell (X=11, Y=1), the bank B includes the cell (X=0, Y=1), the cell (X=4, Y=1) and the cell (X=8, Y=1), the bank C includes the cell (X=1, Y=1), the cell (X=5, Y=1) and the cell (X=9, Y=1), and the bank D includes the cell (X=2, Y=1), the cell (X=6, Y=1) and the cell (X=10, Y=1). Moreover, on the row of cells represented by Y=2, the bank A includes the cell (X=2, Y=2), the cell (X=6, Y=2) and the cell (X=10, Y=2), the bank B includes the cell (X=3, Y=2), the cell (X=7, Y=2) and the cell (X=11, Y=2), the bank C includes the cell (X=0, Y=2), the cell (X=4, Y=2) and the cell (X=8, Y=2), and the bank D includes the cell (X=1, Y=2), the cell (X=5, Y=2) and the cell (X=9, Y=2). Furthermore, on the row of cells represented by Y=3, the bank A includes the cell (X=1, Y=3), the cell (X=5, Y=3) and the cell (X=9, Y=3), the bank B includes the cell. (X=2, Y=3), the cell (X=6, Y=3) and the cell (X=10, Y=3), the bank C includes the cell (X=3, Y=3), the cell (X=7, Y=3) and the cell (X=11, Y=3), and the bank D includes the cell (X=0, Y=3), the cell (X=4, Y=3) and the cell (X=8, Y=3). The method of allocating the X addresses to the row of cells represented by Y=4 is similar to that on the row of cells represented by the Y=0.

Also, at the back stage of the latch section 7, the signal rearranging circuit (not shown) is provided to rearrange the display data outputted from each cell based on the Y address of the LCD read operation in accordance with the array of the pixels of the LCD panel. The configuration other than the above-mentioned configuration in the first modification is similar to that of the third embodiment.

In the first modification, it is possible to further reduce the length of the display RAM in the X-direction by reducing the number of the circuits between the columns of cells, as compared with the third embodiment. The effects other than the above-mentioned effect in the modification are similar to those of the third embodiment.

A second modification of the third embodiment will be described below. FIG. 15 is a view showing a method of allocating the X addresses of the cells in the LCD control driver. As shown in FIG. 15, in the second modification, the memory elements of the display RAM is grouped into cells such that each bank is constituted by four columns of cells.

As shown in FIG. 15, in the display RAM in the second modification, 16 cells are handled as one set, and the addresses of the cells are allocated such that the continuous addresses are not arranged within the same bank in a same row. For example, on the row of cells represented by Y=0, the bank A includes the cell (X=0, Y=0), the cell (X=4, Y=0), the cell (X=8, Y=0) and the cell (X=12, Y=0), and the bank B includes the cell (X=1, Y=0), the cell (X=5, Y=0), the cell (X=9, Y=0) and the cell (X=13, Y=0). Also, although the illustration is omitted, the bank C includes the cell (X=2, Y=0), the cell (X=6, Y=0), the cell (X=10, Y=0) and the cell (X=14, Y=0), and the bank D includes the cell (X=3, Y=0), the cell (X=7, Y=0), the cell (X=11, Y=0) and the cell (X=15, Y=0). Moreover, on the row of cells represented by Y=1, the bank A includes the cell (X=3, Y=1), the cell (X=7, Y=1), the cell (X=11, Y=1) and the cell (X=15, Y=1), and the bank B includes the cell (X=0, Y=1), the cell (X=4, Y=1), the cell (X=8, Y=1) and the cell (X=12, Y=1). Moreover, on the row of cells represented by Y=2, the bank A includes the cell (X=2, Y=2), the cell (X=6, Y=2), the cell (X=10, Y=2) and the cell (X=14, Y=2), and the bank B includes the cell (X=3, Y=2), the cell (X=7, Y=2), the cell (X=11, Y=2) and the cell (X=15, Y=2). Furthermore, on the row of cells represented by Y=3, the bank A includes the cell (X=1, Y=3), the cell (X=5, Y=3), the cell (X=9, Y=3) and the cell (X=13, Y=3), and the bank B includes the cell (X=2, Y=3), the cell (X=6, Y=3), the cell (X=10, Y=3) and the cell (X=14, Y=3). The method of allocating the X address on the row of cells represented by Y=4 is similar to that on the row of cells represented by the Y=0. The configuration other than the above-mentioned configuration in the modification is similar to that of the third embodiment.

In the second modification, it is possible to further reduce the length of the display RAM in the X-direction by reducing the number of the circuits between the columns of cells, as compared with the third embodiment and the first modification. The effects other than the above-mentioned effect in the modification are similar to those of the third embodiment.

As shown in the third embodiment and the first and second modifications, as the number of the banks is reduced, the number of the circuits provided in the each bank is reduced. As a result, the length of the display RAM in the X-direction can be reduced. However, as the number of the banks is reduced, the length of the subword line 11*c* is increased, and the effect of the lowering the consumption current is reduced. Also, when the access time necessary for the LCD read operation is n times the access time necessary for the CPU write operation, the number of the banks is set to be (N+1) or more, if the least integer greater than n is assumed to be N. Also, the X addresses of the cells are desired to be allocated to the respective cells so that the period while the CPU write operation is not carried out on one bank is set continuously N times. Consequently, even if the CPU write operation is continuously carried out on the display RAM, it is possible to reserve for each bank, the period while the LCD read operation is carried out between the CPU write operations. For example, when the access time necessary for the LCD read operation is equal to three times the access time necessary for the CPU write operation, it is desired to install the five or more banks.

Forth Embodiment

Figure 16:
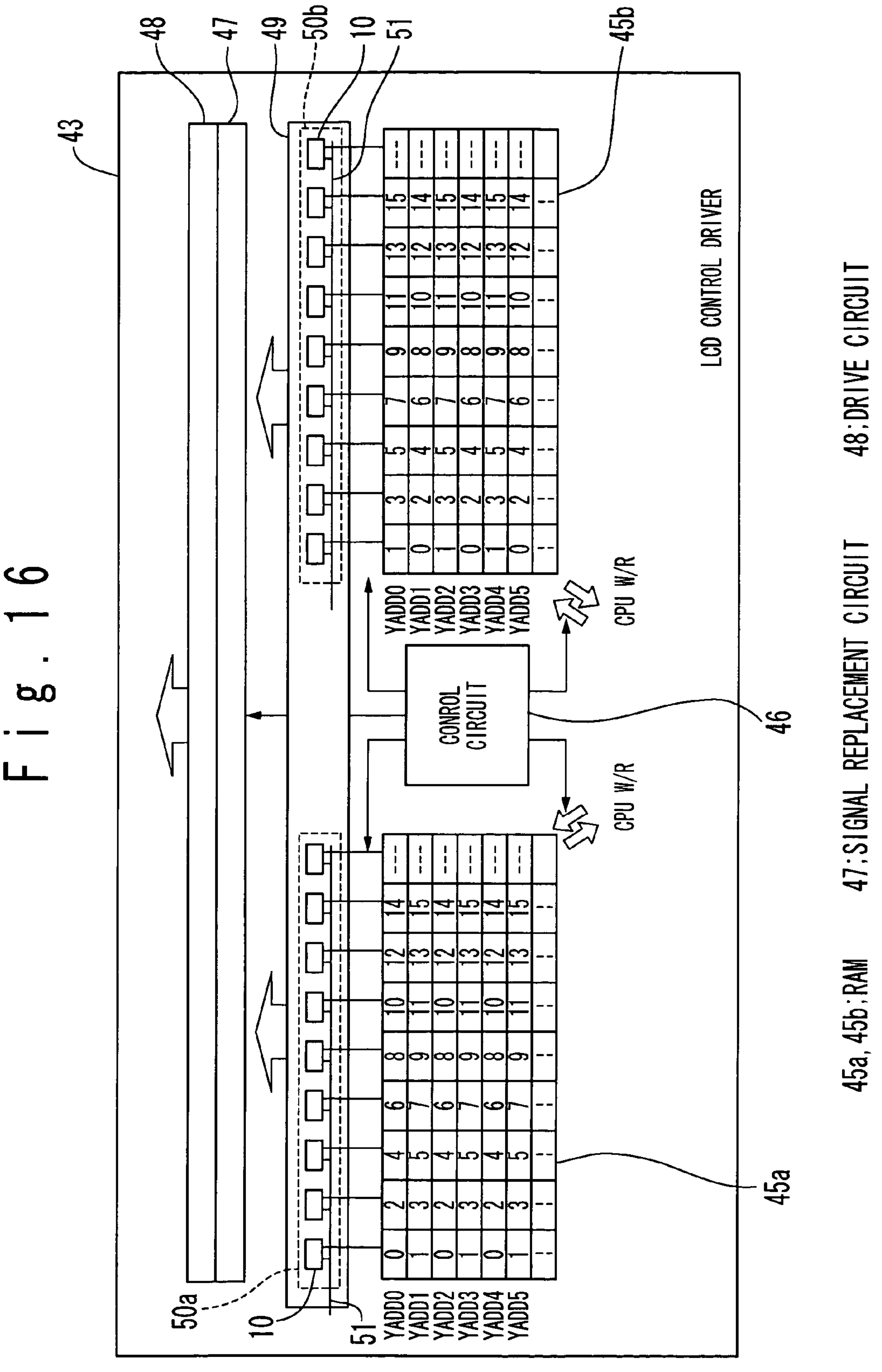
FIG. 16 is a circuit diagram showing the LCD control driver according to a fourth embodiment of the present invention.
Figures 17A, 17B, 17C, 17D, 17E, 17F:
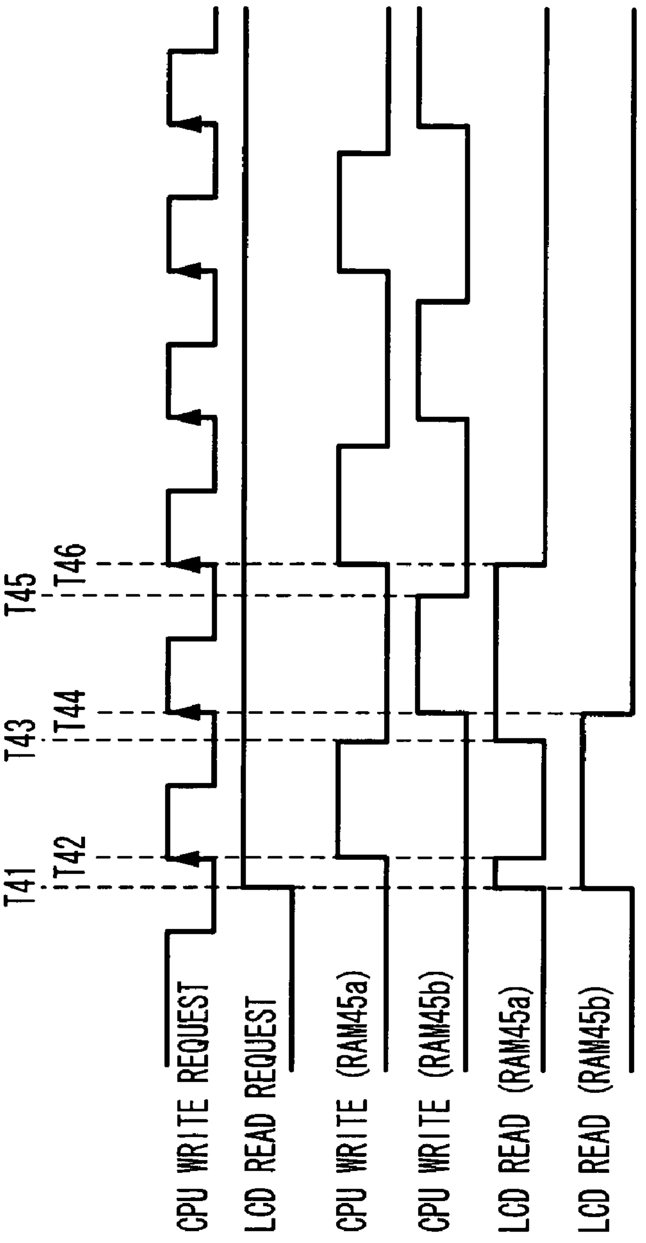
FIGS. 17A to 17F are timing charts showing the operation of the LCD control driver in the fourth embodiment.

The LCD control driver according to the fourth embodiment of the present invention will be described below. FIG. 16 is a circuit diagram showing an LCD control driver according to the fourth embodiment. FIGS. 17A to 17F are timing charts showing the operation of the LCD control driver. The first embodiment indicates the example in which the memory elements of the single display RAM is grouped into the plurality of cells, and each bank contains one column of cells.

As shown in FIG. 16, an LCD control driver 43 according to the fourth embodiment includes two RAMs 45*a* and 45*b*. The RAMs 45*a* and 45*b* constitute a display RAM unit. Also, the LCD control driver 43 contains a control circuit 46 for controlling the RAMs 45*a* and 45*b*, and a latch section 49 for latching the display data for one line, which is outputted from the RAMs 45*a* and 45*b*. A plurality of latches 10 are provided in the latch section 49. The plurality of latches 10 are grouped into two sets 50*a* and 50*b* in correspondence to the RAMs 45*a* and 45*b*, and a wiring 51 is commonly provided for each set. Consequently, the latches 10 for the set 50*a* stores the display data read out from the RAM 45*a*, and the latches 10 for the set 50*b* stores the display data read out from the RAM 45*b*. Moreover, the LCD control driver 43 includes a signal rearranging circuit 47 for rearranging the display data in accordance with the array of the pixels of the LCD panel; and a driving circuit 48 for outputting analog voltage signals in accordance with an output signal from the signal rearranging circuit 47 and driving the LCD panel (not shown).

Also, in the RAMs 45*a* and 45*b*, the X addresses of the respective cells are allocated such that the continuous X addresses are not arranged in a same row of the same RAM. For example, the even X addresses are allocated to the cells of a row in the RAM 45*a* when the Y-address is even, and the odd X addresses are allocated to the cells of a row in the RAM 45*b* when the Y-address is even. On the other hand, the odd X addresses are allocated to the cells of a row in the RAM 45*a* when the Y-address is odd, and the even X addresses are allocated to the cells of a row in the RAM 45*b* when the Y-address is odd. As one example, in the row of cells represented by Y=0, the cells in which X=0, 2, 4, 6, . . . are arranged in the RAM 45*a*, and the cells in which X=1, 3, 5, . . . are arranged in the RAM 45*b*. The configuration other than the above-mentioned configuration in the embodiment is similar to that of the first embodiment.

The operation of the fourth embodiment will be described below. As shown in FIGS. 17A to 17F, a CPU write request is generated at a certain period. It is supposed that an LCD read request is generated at a time T41. Consequently, the LCD read operation to the RAM 45*a* and the LCD read operation to the RAM 45*b* are generated at the same time. Next, the CPU write operation request is generated at a time T42. Thus, the CPU write operation to the cell (X=0, Y=0) of the RAM 45*a* is started, and the LCD read operation to the RAM 45*a* is stopped. At this time, the LCD read operation to the RAM 45*b* is continued. Next, at a time T43, the CPU write operation to the cell (X=0, Y=0) is ended, and the LCD read operation to the RAM 45*a* is started. Next, at a time T44, the CPU write operation to the cell (X=1, Y=0) of the RAM 45*b* is started. At this time, since the LCD read operation to the cell (X=1, Y=0) is already ended, the CPU write operation does not compete. Next, at a time T45, the CPU write operation to the cell (X=1, Y=0) is ended, and at a time T46, the LCD read operation from the RAM 45*a* is ended.

In this way, when the CPU write operation is carried out on the cell (X=0, Y=0), the RAM 45*a* is set to the CPU write operation state. At this time, since the CPU write operation is not carried out on the RAM 45*b*, the LCD read operation can be carried out on the RAM 45*b*. Next, when the CPU write operation is carried out on the cell (X=1, Y=0), the RAM 45*b* is set to the CPU write operation state. At this time, the LCD read operation can be carried out on the RAM 45*a*. Next, when the CPU write operation is carried out on the cell (X=2, Y=0), the RAM 45*a* is set again to the CPU write operation state. At this time, the RAM 45*b* is set to the LCD read operation state. In this way, by devising the method of allocating the X addresses of the cells, it is possible to alternately carry out the CPU write operation to the RAMs 45*a* and 45*b*, and possible to carry out the LCD read operation to the RAM on which the CPU write operation is not carried. Consequently, the CPU write operation and the LCD read operation can be carried out in parallel, thereby improving the operation speed of the CPU. The operation and effect other than the above-mentioned operation and effect in the fourth embodiment are similar to those of the first embodiment.

It should be noted that the fourth embodiment indicates an example in which the two RAMs are installed as two banks. However, the present invention is not limited thereto. When the access time necessary for the LCD read operation is n times the access time necessary for the CPU write operation, if the least integer greater than N is assumed to be N, the number of the RAMs or banks is set to be (N+1) or more. Also, the addresses are desired to be allocated to the respective cells so that the period while the CPU write operation is not carried out on one RAM is set continuously N times. For example, when the access time necessary for the LCD read operation is equal to three times the access time necessary for the CPU write operation, it is desired to install the four or more RAMs. Also, in the fourth embodiment, the CPU write operation can be carried out on the RAMs 45*a* and 45*b* in parallel, in the period while the LCD read operation is not carried out. Thus, the cycle time of the single RAM can be set at the half of the usual time.

Also, in the above-mentioned respective embodiments, the CPU write operation has been mainly described as the CPU operation. However, the CPU read operation is similarly carried out to that of the CPU write operation. Moreover, in the above-mentioned respective embodiments, it is assumed that the access time necessary for the LCD read operation is equal to three times the access time necessary for the CPU write operation. However, this is different depending on the design for the display RAM. For example, the setting of 1.5 to 2.0 times is allowable.

As mentioned above, according to the present invention, the memory elements of a display memory are grouped into a plurality of memories, and while display data is written to one bank, the display data can be read out from another bank. Thus, the speed of a write process can be improved while the write process for the display data is not disturbed by a read process.

What is claimed is:

1. A memory device comprising:

a memory which comprises cells arranged in a matrix of rows and columns, wherein said cells are grouped into banks within said matrix, and each of said banks contains at least one column of said cells; and a control circuit which instructs a read operation in units of rows and a write operation in units of cells, and inhibits said read operation in units of said banks when said write operation is carried out to a specific one of said cells of a specific one of said banks.

2. The memory device according to claim 1, wherein each of said cells comprises memory elements of a predetermined number in a row direction.

3. The memory device according to claim 2, further comprising:

a latch section which latches data for one row of said cells read out from said memory, wherein said latch section comprises:

a plurality of latches provided for columns of memory elements, respectively.

4. The memory device according to claim 3, wherein said plurality of latches are controlled by said control circuit in units of banks.

5. The memory device according to claim 1, wherein said memory further comprises:

two word lines provided for each of said rows of cells, wherein one of said two word lines is for said write operation and the other is for said read operation;

a subword line provided for said cells of each of said rows in each of said banks; and a first switch provided for each of said rows in each of said banks to select one of said two word lines in response to a switch control signal from said control circuit and to connect the selected word line with said subword line.

6. The memory device according to claim 1, wherein each of said banks contains only one column of said cells in a row direction, an address contains an X address and a Y address, said Y address specifies each of said rows of said cells, and said X address specifies each of said columns of said cells, and said X address is incremented one by one in said row direction.

7. The memory device according to claim 6, wherein said write operation is sequentially carried out to said cells of said row which is specified based on said Y address, while said read operation is carried out to said row of said cells.

8. The memory device according to claim 1, wherein each of said banks contains only one column of said cells in a row direction, said address contains an X address and a Y address, said Y address specifies each of said rows of said cells, and said X address specifies each of said columns of said cells, said cells of said rows of a predetermined number in each bank are allocated with sequentially different X addresses as a set, and said cells of each of said rows are allocated with sequentially different X addresses.

9. The memory device according to claim 8, wherein said write operation is sequentially carried out to said cells allocated with a same X address in units of banks, while said read operation is carried out to each of said rows of said cells.

10. The memory device according to claim 8, wherein an access time of each cell in said read operation is n times longer than an access time of the cell in said write operation, and a number of said cells in said set is more than N+1, where the least integer greater than n is N.

11. The memory device according to claim 1, wherein each of said banks contains a plurality of said columns of said cells in a row direction, said address contains an X address and a Y address, said Y address specifies each of said rows of said cells, and said X address specifies each of said columns of said cells, said cells of said rows of a predetermined number in each bank are allocated with sequentially different X addresses as a set, and said cells of each of said rows of said cells are allocated with sequentially different X addresses.

12. The memory device according to claim 11, wherein said write operation is sequentially carried out to said cells allocated with a same X address in units of banks, while said read operation is carried out to each of said rows of said cells.

13. The memory device according to claim 11, wherein an access time of each cell in said read operation is n times longer than an access time of the cell in said write operation, and a number of said cells in said set is more than N+1, where the least integer greater than n is N.

14. The memory device according to claim 1, wherein said memory contains two of said banks, each of said banks contains a plurality of said columns of said cells in a row direction, said address contains an X address and a Y address, said Y address specifies each of said rows of said cells, and said X address specifies each of said columns of said cells, said cells of said rows in each bank are allocated with different X addresses, and said cells of each of said rows of said cells are allocated with sequentially different X addresses.

15. The memory device according to claim 14, wherein said write operation is alternately carried out to said two banks, while said read operation is carried out to one of said two banks to which said write operation is not carried.

16. A display control driver comprising:

a memory which comprises cells arranged in a matrix of rows and columns, wherein said cells are grouped into banks within said matrix, and each of said banks contains at least one column of said cells; and a control circuit which instructs a read operation in units of rows and a write operation in units of cells, and inhibits said read operation in units of said banks when said write operation is carried out to a specific one of said cells of a specific one of said banks.

17. The display control driver to according to claim 16, further comprising:

a latch section which latches data for one row of said cells read out from said memory, wherein said latch section comprises:

a plurality of latches provided for columns of memory elements, respectively.

18. A display apparatus comprising:

a display panel having a plurality of pixels; and a display control driver which comprises:

a memory which comprises cells arranged in a matrix of rows and columns, wherein each of said cells stores a display data for one of said plurality of pixels, said cells are grouped into banks within said matrix, and each of said banks contains at least one column of said cells; and a control circuit which instructs a read operation in units of rows and a write operation in units of cells, and inhibits said read operation in units of said banks when said write operation is carried out to a specific one of said cells of a specific one of said banks, wherein said display data read out from memory by said read operation is displayed on one horizontal line of said display panel.

19. The display apparatus according to claim 18, wherein each of said cells comprises memory elements of a predetermined number in a row direction.

20. The display apparatus according to claim 19, wherein said display control driver further comprises:

a latch section which latches data for one row of said cells read out from said memory, wherein said latch section comprises:

a plurality of latches provided for columns of memory elements, respectively.

21. The display apparatus according to claim 20, wherein said plurality of latches are controlled by said control circuit in units of banks.

22. The display apparatus according to claim 18, wherein said memory further comprises:

two word lines provided for each of said rows of cells, where one of said two word lines is for said write operation and the other is for said read operation;

a subword line provided for said cells of each of said rows in each of said banks; and a first switch which provided for each of said rows in each of said banks to select one of said two word lines in response to a switch control signal from said control circuit and to connect the selected word line with said subword line.

23. A method of controlling a display, comprising:

carrying out a read operation in units of rows of a memory, wherein said memory comprises cells arranged in a matrix of said rows and columns, said cells are grouped into banks within said matrix, and each of said banks contains at least one column of said cells;

carrying out a write operation in units of said cells of said memory; and inhibiting said read operation in units of said banks when said write operation is carried out to a specific one of said cells of a specific one of said banks.

24. The method according to claim 23, wherein each of said banks contains only one column of said cells in a row direction, an address contains an X address and a Y address, said Y address specifies each of said rows of said cells, said X address specifies each of said columns of said cells, and said X address is incremented one by one in said row direction.

25. The method according to claim 24, wherein said write operation is sequentially carried out to said cells of said row which is specified based on said Y address, while said read operation is carried out to said row of said cells.

26. The method according to claim 23, wherein each of said banks contains only one column of said cells in a row direction, said address contains an X address and a Y address, said Y address specifies each of said rows of said cells, and said X address specifies each of said columns of said cells, said cells of said rows of a predetermined number in each bank are allocated with sequentially different X addresses as a set, and said cells of each of said rows are allocated with sequentially different X addresses.

27. The method according to claim 26, wherein said write operation is sequentially carried out to said cells allocated with a same X address in units of banks, while said read operation is carried out to each of said rows of said cells.

28. The method according to claim 23, wherein each of said banks contains a plurality of said columns of said cells in a row direction, said address contains an X address and a Y address, said Y address specifies each of said rows of said cells, and said X address specifies each of said columns of said cells, said cells of said rows of a predetermined number in each bank are allocated with sequentially different X addresses as a set, and said cells of each of said rows of said cells are allocated with sequentially different X addresses.

29. The method according to claim 28, wherein said write operation is sequentially carried out to said cells allocated with a same X address in units of banks, while said read operation is carried out to each of said rows of said cells.

30. The method according to claim 23, wherein said memory contains two of said banks, each of said banks contains a plurality of said columns of said cells in a row direction, said address contains an X address and a Y address, said Y address specifies each of said rows of said cells, and said X address specifies each of said columns of said cells, said cells of said rows in each bank are allocated with different X addresses, and said cells of each of said rows of said cells are allocated with sequentially different X addresses.

31. The method according to claim 30, wherein said write operation is alternately carried out to said two banks, while said read operation is carried out to one of said two banks to which said write operation is not carried.

* * * * *